United States Patent
Corem et al.

(10) Patent No.: US 7,454,100 B2
(45) Date of Patent: Nov. 18, 2008

(54) SINGLE-POLE OPTICAL WAVELENGTH SELECTOR

(75) Inventors: Yossi Corem, Beit Shemesh (IL); SeongWoo Suh, Mount Olive, NJ (US); Boris Frenkel, Jerusalem (IL); Haggai Arbell, Jerusalem (IL)

(73) Assignee: Xtellus, Inc., Morris Plains, NJ (US)

(*) Notice: Subject to any disclaimer, the term of this patent is extended or adjusted under 35 U.S.C. 154(b) by 0 days.

(21) Appl. No.: 11/914,946

(22) PCT Filed: May 18, 2006

(86) PCT No.: PCT/IL2006/000590

§ 371 (c)(1),
(2), (4) Date: Feb. 6, 2008

(87) PCT Pub. No.: WO2006/123344

PCT Pub. Date: Nov. 23, 2006

(65) Prior Publication Data

US 2008/0181559 A1 Jul. 31, 2008

Related U.S. Application Data

(60) Provisional application No. 60/671,971, filed on May 19, 2005.

(51) Int. Cl.
*G02B 6/42* (2006.01)
(52) U.S. Cl. ............................... 385/18; 385/15; 385/16; 385/17
(58) Field of Classification Search ............... 385/15–18
See application file for complete search history.

(56) References Cited

U.S. PATENT DOCUMENTS

| | | | |
|---|---|---|---|
| 4,558,952 | A | 12/1985 | Kulesh et al. |
| 4,959,665 | A | 9/1990 | Saito et al. |
| 6,513,953 | B1 | 2/2003 | Itoh et al. |
| 6,563,974 | B2 | 5/2003 | Agha Riza |
| 6,678,430 | B1 | 1/2004 | Noe et al. |
| 6,867,868 | B1 | 3/2005 | Barbarossa |
| 7,357,510 | B2 | 4/2008 | Kim et al. |

FOREIGN PATENT DOCUMENTS

| | | |
|---|---|---|
| WO | 03/032071 | 4/2003 |
| WO | 2005/052507 | 6/2005 |

*Primary Examiner*—Frank G Font
*Assistant Examiner*—Eric Wong
(74) *Attorney, Agent, or Firm*—Darby & Darby PC

(57) ABSTRACT

A fiber-optical, wavelength selective switch, especially for channel blocking applications. The input signal is converted to light beams having predefined polarizations relative to the plane in which optical manipulation of the beam is performed. The beams are then preferably laterally expanded in this system plane only, and then spatially dispersed in the beam expansion plane, preferably by means of a diffraction grating. The light is directed through a polarization rotation device, preferably a liquid crystal cell, pixelated along the wavelength dispersive direction such that each pixel operates on a separate wavelength. When the appropriate control voltage is applied to a pixel, the polarization of the light signal passing through that pixel is rotated. The wavelength dispersed beams from all of the pixels are then recombined, and are passed towards a polarization selective device, aligned such that only selected polarization components are transmitted out of the switch.

65 Claims, 22 Drawing Sheets

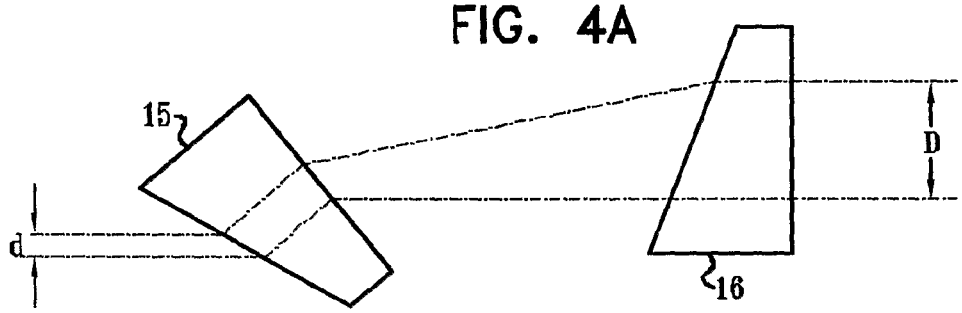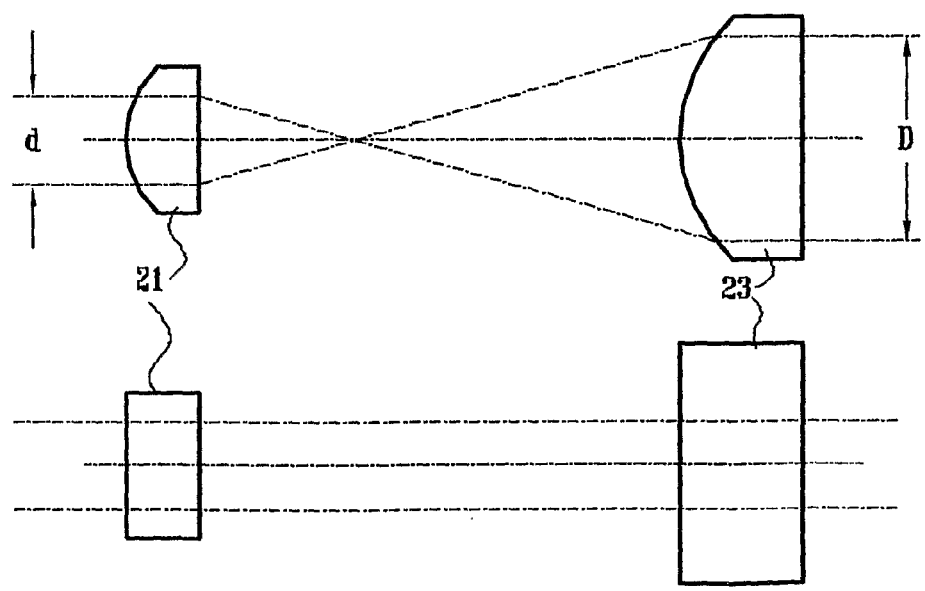

SINGLE-POLE OPTICAL WAVELENGTH SELECTOR

CROSS REFERENCE TO RELATED APPLICATIONS

This application is the 371 U.S. National Phase of International Application No. PCT/IL2006/000590, filed May 18, 2006, which claims priority to U.S. Provisional Patent Application No. 60/671,971, filed on May 19, 2005, both of which are incorporated by reference herein. The PCT application published in English as WO2006/123344 A2.

FIELD OF THE INVENTION

The present invention relates to the field of fast optical switches, whose operation can be made wavelength dependent, especially for use as a channel blocker in an optical communication system.

BACKGROUND OF THE INVENTION

It is known in the field of optical communications to use optical wavelengths as optical carriers for carrying digital or analog information. Also, the different wavelengths may be used to discriminate one set or channel of information from another. When a plurality of wavelengths are coupled or multiplexed onto a single fiber, this is called wavelength division multiplexing (WDM). Use of such WDM increases the overall bandwidth of the system. For example, a single fiber carrying two wavelengths has twice the bandwidth of a fiber carrying a single wavelength. Generally, a large number of channels would be carried on one fiber. The closer the channel spacing, the greater the number of channels that may be transmitted over the fiber. Recently the International Telecommunications Union has proposed a Dense WDM ("DWDM") network standard with optical signal channels having a frequency separation of 100 GHz (equivalent to a wavelength separation of about 0.8 nm), in order to ensure high utilization of the available optical bandwidth, and even denser standards are envisaged. The performance requirements for a DWDM network (such as those for bandwidth, cross talk, polarization dependent loss, polarization mode dispersion, insertion loss) are becoming more stringent. Additionally, it is anticipated that future efforts to increase capacity by reducing optical channel spacing will require additional improvements in optical system components In co-pending PCT Application No. PCT/IL02/00511, hereby incorporated by reference in its entirety, there is disclosed a wavelength selective switch wherein an input optical signal is spatially wavelength-dispersed and polarization-split in two preferably perpendicular planes. The wavelength dispersion is preferably performed by a diffraction grating, and the polarization-splitting by a polarized beam splitter. A polarization rotation device, such as a liquid crystal polarization modulator, pixelated along the wavelength dispersive direction such that each pixel operates on a separate wavelength channel, is operative to rotate the polarization of the light signal passing through each pixel, according to the control voltage applied to the pixel. The polarization modulated signals are then wavelength-recombined and polarization-recombined by means of similar dispersion and polarization combining components as were used to respectively disperse and split the input signals. At the output polarization recombiner, the direction in which the resulting output signal is directed is determined by whether the polarization of the particular wavelength channel was rotated by the polarization modulator pixel, or not. A fast, wavelength selective, optical switch is thus provided, capable of use in WDM switching applications. Such a switch can also be provided in a 1×1 configuration, for use as a channel blocker. However, the use of two-channel input and output ports makes the switch unnecessarily complicated for such use. Furthermore, the resolution and insertion loss may be inferior to what could be achieved in a switch constructed from the outset for single pole, single channel switching.

There therefore exists a need for a fiber optical, single-pole, wavelength selective optical switch which can be manufactured inexpensively, while also being small in size for easy installation, reliable, have very low insertion loss, high wavelength resolution and stable performance over a variety of environmental conditions of the network.

The disclosures of each of the publications mentioned in this section and in other sections of the specification, are hereby incorporated by reference, each in its entirety.

SUMMARY OF THE INVENTION

The present invention seeks to provide a new fiber-optical, single-pole, wavelength selective switch structure, such as is used for channel blocking applications in optical communication and information transmission systems. The switch uses a minimum of components, and can thus be economically constructed for large scale use in such systems. Variations of the switch geometry enable one- or two-way configurations to be realized, and the switches can also be stacked to provide multi-pole operation. The switch structure can also be used as a wavelength selective variable optical attenuator.

In co-pending PCT Application PCT/IL2003/001002, published as International Publication No. WO 2005/052507, there are described wavelength selective switches, wherein the input optical signal is first converted to light beams having a defined polarization with respect to the system plane in which optical manipulation of the beam is to be performed, this system plane of optical manipulation being described hereinbelow. This "defined polarization" can either preferably be a linear polarization having a generally defined direction, or alternatively and preferably, a circularly polarized beam having a defined direction of polarization rotation. The current application seeks to provide wavelength selective switch structures having some elements common to those of the switches shown in co-pending PCT/IL2003/001002, but using more complex polarization options, and different geometrical/optical configurations such that greater versatility and utility are enabled, together with more compact structures. The term "linear polarization" as used and as claimed in this specification, is understood to refer to a polarized beam of light which is intended to have a single linear polarization in the desired direction, even though it may still contain some polarization components in directions other than that desired. Similarly, the term "circularly polarized", as used and as claimed in this specification, is understood to refer to a polarized beam of light which is intended to have a circular polarization in the desired rotation direction, even though it may still contain some polarization components in directions which may cause it to be somewhat elliptic.

For preferred embodiments using a generally linear polarization, the polarization conversion is preferably performed by means of a birefringent crystal, also known as a beam walk-off crystal, such as $YVO_4$. In the embodiments shown in co-pending PCT/IL2003/001002, this birefringent crystal has a half wave plate covering approximately one half of the output port. Such a component is commercially available from the JDSU-Casix Corp., of Fuzhou, China, by whom it is described as a C-polarizer, this name now being in common generic use in the art. For such an embodiment, the resulting generally linearly polarized output beam, which is assumed exemplarily to be the S-polarization, is then, according to one embodiment, laterally expanded in the system plane, i.e. in the plane parallel to the direction of S-polarization, preferably by means of a pair of anamorphic prisms, though any alternative method, such as a cylindrical lens telescope system, or even a single prism, could also be utilized. The beam is then spatially wavelength-dispersed in the same plane as that of the beam expansion, preferably by means of a diffraction grating. Lateral expansion of the beam, combined with dispersion in the same plane as that of the lateral expansion provides such switches with significant advantages over prior art switches, especially with respect to the reduction in switch height thus enabled, and in the increased wavelength resolution thus enabled, though this is independent of whether the beam expansion is isotropic or laterally directed.

The light is directed through a polarization conversion device, preferably a liquid crystal cell. Throughout this application, the various embodiments are generally described as having liquid crystal elements for generating the polarization rotation, but it is to be understood that this is not meant to detract from the generality of the invention, and any suitable polarization rotation element can be equivalently used in those embodiments. The polarization rotation element is pixelated along the wavelength dispersive direction such that each pixel operates on a separate wavelength. When the appropriate control voltage is applied to a pixel, the polarization of the light signal passing through that pixel is rotated from S- to P-polarization. The wavelength dispersed beams from all of the pixels are then recombined, preferably by means of a similar grating to that which was used to disperse the input beams, and are passed towards the switch output. At this output, in the switches described in co-pending PCT/IL2003/001002, there is disposed another C-polarizer, aligned in the same polarization direction as that of the input C-polarizer, such that only the S-polarization is allowed to exit and the P-polarization is blocked. A linear polarizer, aligned parallel to the S-polarization direction, can optionally be located before the output beam enters the C-polarizer, to increase the extinction ratio. The light of wavelengths which passed through pixels which did not rotate the polarization, is thus output from the switch attenuated only by the small insertion loss of the switch. Light, on the other hand, of wavelengths which passed through pixels which did rotate the polarization direction from S- to P-, is highly attenuated and generally blocked from exiting the switch because of the C-polarizer, aligned such that only the S-polarization is transmitted and the P-polarization blocked. Since each pixel is related to a specific wavelength, the resulting effect is that of a wavelength dependent, ON/OFF optical switch. Each channel is capable of being switched according to the switching rate of the liquid crystal cell pixels, and therefore suitable for use in WDM or DWDM switching applications.

In the above description of the operation of the switches more fully described in; co-pending PCT/IL2003/001002, use has been made of a C-polarizer to generate beams of the same polarization. In accordance with a preferred embodiment of the present invention, there is now provided an optical switching device, in which, use may be made of a birefringent beam walk-off crystal without a half-wave plate on part of its output, to split the input light into separate beams of P- and the S-polarization, and each polarization beam is input to the lateral beam expander and wavelength dispersive element. In contrast to the C-polarizer embodiments mentioned in co-pending PCT/IL2003/001002, where, if a grating is used as the wavelength dispersion element, use is preferably made of high efficiency gratings, the grating used in this embodiment should preferably have a low polarization dependent loss (lpdl), so that it is able to handle the beams of different polarization. The polarization switching procedure is somewhat modified, as will be described in the various descriptions of the preferred embodiments of the invention below. In the preferred embodiments of the present invention, selection of those wavelengths which are transmitted and those which are blocked is dependent on a combination of polarization sensitive components and their status, which in combination direct and rotate the polarization of the light passing therethrough. The ultimate component or group of components responsible for transmitting or blocking the light passage, is sometimes generically called in this application, and may also thuswise be claimed, a polarization selective device, whether it refers to a C-polarizer, or a linear polarization plate, or a birefringent walk-off crystal, or a polarized beam splitter, or a combination thereof. Such polarization selective components may also preferably include a conventional cubic polarization beam splitter, a Glan-Taylor polarizer, a Glan-laser polarizer, a Glan-Thompson prism, a Wollaston prism, and a Rochon polarizer.

For an embodiment using a circularly polarized beam of light, the circular polarization is preferably generated by inserting a quarter wave plate into the path of the initially generated linearly polarized beam, though any alternative method known in the art of producing a circularly polarized beam may also be used. The polarization conversion device, preferably a liquid crystal cell, is arranged to be such that when the appropriate control voltage is applied to a pixel, the symmetry of the polarization of the light passing through that pixel is reversed, such that, for instance, a clockwise or right handed polarization signal is converted to an anti-clockwise or left handed polarization signal, or vice versa. By this means, it becomes simple at the output of the switch, to block or to transmit light which has passed through a specific pixel, according to whether the output has symmetric polarization relative to the input signal or has been converted to antisymmetric polarization by the liquid crystal cell. After passage through the liquid crystal cell, or equivalent, the circular polarization is preferably converted back into linear polarization at the output side of the switch, thus enabling simple blocking or transmission of the output beam by means of a linear polarizer and/or a C-polarizer. Light of wavelengths which passed through pixels which did not reverse the symmetry of the polarization, is thus output from the switch attenuated only by the small insertion loss of the switch. Light, on the other hand, of wavelengths which passed through pixels which did reverse the symmetry of the polarization to the antisymmetric mode, is highly attenuated and generally blocked from exiting the switch.

The mutual alignment directions of the various components of the switch play an important part in the efficiency of its operation. Thus, for the linear polarization preferred embodiments, the preferred anamorphic prism pair is preferably aligned relative to the S-polarization of the incident beam such as to ensure an incident angle close to the Brewster angle. At this angle of incidence, the S-polarization component therefore transmits through the prism pair with optimum efficiency, resulting in a lower insertion loss. Similarly, the beam expansion in the plane perpendicular to the direction of the grating rulings ensures high wavelength resolution. Furthermore, the plane of the S-polarization of the incident beam perpendicular to the direction of the grating rulings ensures optimum grating efficiency.

The combination of some or all of the following three features, namely the use of resolution-advantageous beam expansion in the same plane as that of the grating dispersion plane, the use of polarization selection to provide optimum grating efficiency, and the use of polarization selection by means of the serial use of multiple polarization selection elements, results in a wavelength selective single pole switch with increased wavelength resolution and increased on/off attenuation ratio in comparison with previously available optical switches. Furthermore, the use of an anamorphic prism pair to laterally expand and compress the beams, rather than the use of alternative components which can be used to generate such one dimensional magnification, generally results in a lower insertion loss to the switch when in its transmissive state. Additionally, such a switch can be constructed more compactly and more economically than previously available switches performing a similar function.

In the above described embodiments, the S-polarization direction of the light traversing the system is parallel both to the plane of the beam expansion and to the plane of the beam dispersion. This embodiment provides the optimum optical transmission characteristics, and hence the lowest switch insertion loss. However, it is to be understood that the switch is also operative, according to other preferred embodiments, with the direction of the light polarization at angles other than parallel to the expansion and dispersion directions. The switch efficiency, however, is then generally lower. A preferred feature relating to the orientation planes of the components of those embodiments of the present invention where directive lateral beam expansion is used, is that the plane of the beam expansion is parallel to the plane of the beam dispersion.

Furthermore, although in the above described embodiments, the alignment of the polarization selection components has been defined as being such that when a pixel of the polarization rotation device is switched, the light which passes therethrough is blocked from exiting the switch, and the light passing through an unswitched pixel is transmitted, this being termed a "Normally Open" switch in the art, it is to be understood that the present invention would operate equally effectively in the opposite mode, namely that the polarization rotation device be programmed and the polarization sensitive devices aligned, such that it is the light which passes through unswitched pixels which is blocked, and the light which passes through switched pixels which exits the switch, this being termed a "Normally Closed" switch in the art.

According to another preferred embodiment of the switch of the present invention, the use of a reflecting surface after the polarization rotator, operative to direct the polarization controlled light back down its incident path, enables the number of components in the switch to be substantially reduced, to almost half that of the first-mentioned transmissive embodiments. Such reflective switch embodiments use a circulator or a polarized beam splitter, such as one of those types defined hereinabove, disposed in the input/output beam path or fiber, to separate the input from the output signals. Furthermore, the use of a polarized beam splitter and one or more circulators enables 2-way switches to be constructed, either as 1×2 or as 2×2 embodiments. The use of polarized beam splitters in the input and output sides of the switch elements also enables 1×2 and 2×2 transmissive switches to be implemented.

According to further preferred embodiments of the present invention, reflective switches can be implemented without the use of circulators or polarized beam splitters, by ensuring that the reflected beam is returned from the polarization rotation element along a different path than that of the input beam. This is generally achieved be means of suitable geometric alignment of the reflective surface relative to the input beam, such that the input beam does not impinge on the reflective surface at normal incidence. There are two main configurations for achieving this. The spatial displacement of the input and output beams can be performed either in the plane of the dispersion, in which case the device is known as having a "side-by-side" configuration, or the spatial displacement can be performed in a plane perpendicular to that of the dispersion, in which case the device is known as having a "two level" configuration. Each of these preferred configurations has advantages in terms of the packaging volume of switches or switch arrays implemented therewith, as will be further explained hereinbelow.

The above depicted preferred embodiments of the present invention have all been described in terms of a switch which is designed either to essentially completely transmit all of the desired wavelength components of the incident light signal, or to essentially completely block transmission of desired wavelength components. According to further preferred embodiments of the present invention, the same switch structure can be arranged to operate as a wavelength dependent variable optical attenuator. In this embodiment, the signal applied to a pixel is arranged to be such as to rotate the polarization of the light passing through that pixel to a predetermined intermediate alignment, so as to vary the fractional component of light of polarization which is transmitted through the polarization analyzer at the output. Variation of the rotation of the polarization of the light passing through a pixel enables the level of light transmitted at the wavelength corresponding to that pixel to be varied between minimum and maximum transmission levels.

According to further preferred embodiments of the present invention, there are also provided switch structures as described hereinabove, but wherein lateral beam expansion is not needed for the proposed application and is not therefore used, such that the polarization-processed input beam is passed directly to the wavelength dispersion device. In such switches, since the numerical aperture of the beam in the focusing element is smaller than in similar switches having expansion in the dispersion direction, the focused beam spot is larger, and the wavelength resolution correspondingly reduced. Though such a resolution reduction may be detrimental to channel blocking or switching applications where neighboring channel separation is an important parameter, it may not be of such importance in applications such as dynamic gain equalization (DGE), where the switching element is used to try to equalize gain in the channels. In such applications, since changes in gain between neighboring channels are generally smaller, and can be accepted, there is no need for high channel-to-channel resolution.

According to further preferred embodiments of the present invention, there is provided a new method and system utilizing the bi-directional properties of light propagation, to ensure maximum utilization of transmissive bi-directional optical system modules. The input and output ports of the optical module are equipped with directionally dependent components such as circulators such that the light entering or leaving that port can be separated into different pathways. In this way, each bi-directional port of the optical module is effectively converted by the circulator into two unidirectional ports, in which input and output signals are separated, such that a single module can be used in two separate circuits. The optical module can preferably be a 1×1 optical switch, such as a wavelength selective switch, a dynamic gain equalizer, a filter, a channel blocker, or any other optical signal processing module, on condition that it is truly bi-directional.

There is further provided in accordance with yet another preferred embodiment of the present invention, a wavelength selective optical switch comprising:
(a) a first birefringent element for receiving input light having a plurality of wavelength components, the element adapted to decompose the input light into two light beams having different polarizations,
(b) a beam expanding device for expanding the two light beams having different polarizations in a predetermined plane,
(c) a first dispersive element receiving the expanded two light beams having different polarizations, and dispersing different wavelength components of the expanded light beams in the predetermined plane,
(d) at least one optical element for focusing the dispersed wavelength components of the expanded light beams of different polarizations onto a focal plane,
(e) a polarization rotation element located essentially at the focal plane, the polarization rotation element being pixelated generally along the direction of the dispersion such that separate pixels are associated with separate wavelength components of the expanded light, at least one pixel of the polarization rotation element being operative to rotate the polarization of light passing through the pixel according to a control signal applied to the pixel,
(f) at least one optical element for collecting the dispersed wavelength components of the expanded light beams after passing through the polarization rotation element, to regenerate two output expanded light beams,
(g) a second dispersive element receiving the two output expanded light beams and operative to combine them into two multi-wavelength output light beams,
(h) a beam compressing device aligned such that the two multi-wavelength output light beams are compressed in the predetermined plane, and
(i) a second birefringent element for combining only those wavelength components of the two multi-wavelength output light beams having predetermined different polarizations into one transmitted output beam.

In the above described wavelength selective optical switch, the transmission of the light in the output beam having a wavelength component associated with the at least one pixel, may preferably be determined by the control signal. In addition, at least one of the first and second dispersive elements is preferably a grating having low polarization dependent loss. Furthermore, the at least one optical element for focusing the dispersed wavelength components of the expanded light beams of different polarizations onto a focal plane may preferably be the first dispersive element itself. Additionally, the control signal applied to the pixel is preferably such as to rotate the direction of the polarization of light passing through the pixel through essentially 90°.

Furthermore, in accordance with yet another preferred embodiment of the present invention, there is provided a wavelength selective switch module comprising a plurality of any of the wavelength selective switches described above, and wherein at least two of the wavelength dependent switches utilize a common one of at least one of a dispersive element, a focusing element and a polarization rotation element.

There is also provided in accordance with still another preferred embodiment of the present invention, a wavelength selective optical switch comprising:
(a) a first birefringent element for receiving input light having a plurality of wavelength components, the element adapted to decompose the input light into two light beams having essentially the same predetermined polarization direction,
(b) a beam expanding device for expanding the two light beams in a predetermined plane,
(c) a first dispersive element receiving the expanded two light beams, and dispersing different wavelength components of the expanded light beams in the predetermined plane,
(d) a first at least one optical element for focusing the dispersed wavelength components of the expanded light beams onto a focal plane,
(e) a polarization rotation element located essentially at the focal plane, the polarization rotation element being pixelated generally along the direction of the dispersion such that separate pixels are associated with separate wavelength components of the expanded light, at least one pixel of the polarization rotation element being operative to rotate the polarization of light passing through the pixel according to a control signal applied to the pixel,
(f) a second at least one optical element for collecting the dispersed wavelength components of the expanded light beams after passing through the polarization rotation element, to regenerate two output expanded light beams,
(g) a second dispersive element receiving the two output expanded light beams and operative to combine them into two multi-wavelength output light beams, and
(h) a reflective element disposed downstream of the second dispersive element operative to reflect the output light beams back through the switch along their input path but in a reverse direction, and wherein only those wavelength components of light reflected back through the at least one pixel having the predetermined polarization direction are recombined by the first birefringent element for transmission back out of the switch.

The last-described switch may also preferably comprise a beam compressing device disposed after the second dispersive element and wherein the reflective element is disposed after the beam compressing device. The beam compressing device may preferably comprise a plurality of components, in which case the reflective element may preferably be disposed between the components. The switch may also preferably comprise a linear polarizing element disposed in front of the reflective element. Furthermore, the input light may preferably be received from an input fiber, and the light directed back through the switch preferably directed into an output fiber, in which case the switch may also preferably comprise a beam separating element to separate light in the output fiber from light in the input fiber. This beam separating device may preferably be a circulator.

In accordance with a further preferred embodiment of the present invention, there is also provided a wavelength selective optical switch comprising:
(a) a birefringent element for receiving input light having a plurality of wavelength components, the element adapted to decompose the input light into two light beams having essentially the same predetermined polarization direction,
(b) a beam expanding device for expanding the two light beams in a predetermined plane,
(c) a dispersive element receiving the expanded two light beams, and dispersing different wavelength components of the expanded light beams in the predetermined plane,
(d) a first at least one optical element for focusing the dispersed wavelength components of the expanded light beams onto a focal plane,
(e) a polarization rotation element located essentially at the focal plane, the polarization rotation element being pixelated generally along the direction of the dispersion such that separate pixels are associated with separate wavelength components of the expanded light beams, at least one pixel of the polarization rotation element being operative to rotate the polarization of light passing through the pixel according to a control signal applied to the pixel, (f) a second at least one optical element for collecting the dispersed wavelength components of the expanded light beams after passing through the polarization rotation element, to regenerate two output expanded light beams, (g) a third at least one optical element for collimating the regenerated two output expanded light beams, and (h) a reflective element disposed in the collimated regenerated two output expanded light beams, and operative to reflect the output light beams back through the switch essentially along their input path but in a reverse direction, and wherein only those wavelength components of the light reflected back through the at least one pixel having the predetermined polarization direction are recombined by the birefringent element for transmission back out of the switch.

The last-described switch may also preferably comprise a linear polarizing element disposed in front of the reflective element. Furthermore, the input light may preferably be received from an input fiber, and the light directed back through the switch preferably directed into an output fiber, in which case the switch may also preferably comprise a beam separating element to separate light in the output fiber from light in the input fiber. This beam separating device may preferably be a circulator.

There is also provided in accordance with yet a further preferred embodiment of the present invention, a wavelength selective optical switch comprising:

(a) a birefringent element for receiving input light having a plurality of wavelength components, the element adapted to decompose the input light into two light beams having different polarizations, (b) a beam expanding device for expanding the two light beams having different polarizations in a predetermined plane, (c) a dispersive element receiving the expanded two light beams having different polarizations, and dispersing different wavelength components of the expanded two light beams in the predetermined plane, (d) at least one optical element for focusing the dispersed wavelength components of the expanded two light beams of different polarizations onto a focal plane, (e) a polarization rotation element located essentially at the focal plane, the polarization rotation element being pixelated generally along the direction of the dispersion such that separate pixels are associated with separate wavelength components of the two light beams, at least one pixel of the polarization rotation element being operative to rotate the polarization of light passing through the pixel according to a control signal applied thereto, and (f) a reflective surface disposed in proximity to and after the polarization rotation element, such that the wavelength components of the two light beams passing through the at least one pixel of the polarization rotation element are reflected back through the at least one pixel.

In the previously-mentioned wavelength selective optical switch, the wavelength components of the two light beams reflected back through the at least one pixel are preferably directed back through the switch essentially along their input path, but in a reverse direction, through the at least one optical element, the dispersive element, the beam expanding device, and the birefringent element, and preferably only those wavelength components of the light reflected back through the at least one pixel having predetermined different polarizations are then recombined by the birefringent element for transmission back out of the switch. In such a switch, the transmission back out of the switch of the light having a wavelength component associated with the at least one pixel, is preferably determined by the control signal. Additionally, the control signal applied to the at least one pixel is preferably such as to rotate the direction of the polarization of light passing through the pixel through essentially 45°. Furthermore, the input light may preferably be received from an input fiber, and the light directed back through the switch directed into an output fiber, and the switch may also then comprise a beam separating device to separate light in the output fiber from light in the input fiber. The beam separating device may preferably be a circulator.

There is even further provided in accordance with a preferred embodiment of the present invention, a wavelength selective optical switch comprising:

(a) a birefringent element for receiving input light having a plurality of wavelength components from a first input port, the element adapted to decompose the input light into two light beams having the same predetermined polarization, (b) a polarized beam splitting device receiving the two light beams having the same predetermined polarization, (c) a beam expanding device for expanding in a predetermined plane, the two light beams after transmission through the polarized beam splitter, (d) a dispersive element receiving the expanded two light beams, and dispersing different wavelength components of the expanded two light beams in the predetermined plane, (e) at least one optical element for focusing the dispersed wavelength components of the expanded two light beams onto a focal plane, (f) a polarization rotation element located essentially at the focal plane, the polarization rotation element being pixelated generally along the direction of the dispersion such that separate pixels are associated with separate wavelength components of the two light beams, at least one pixel of the polarization rotation element being operative to rotate the polarization of light passing through the pixel according to a control signal applied thereto, (g) a reflective surface disposed in proximity to and after the polarization rotation element, such that wavelength components of the two light beams passing through the at least one pixel of the polarization rotation element are reflected back through the at least one pixel, and (h) and a second birefringent element disposed at a reflective output of the polarized beam splitter, for receiving two light beams reflected in the polarized beam splitter and having like but orthogonal polarization to the predetermined polarization, the second birefringent element being adapted to recompose the two light beams into an output light beam, such that those wavelength components of the two light beams reflected back through the polarization rotation element having their polarization direction rotated by the at least one pixel are output from the switch at a first output port.

In this wavelength selective optical switch, the polarized beam splitting device is preferably any one of a polarization cubic beam splitter, a Glan-Taylor polarizer, a Glan-laser polarizer, a Glan-Thompson prism, a Wollaston prism, or a Rochon polarizer.

Furthermore, this wavelength selective optical switch may preferably also comprise a linear polarizing element having an extinction ratio, disposed between the polarization rotation element and the reflective surface, the linear polarizer being aligned such that it attenuates by the extinction ratio, light having a predetermined polarization direction transmitted by the pixel, and after reflection by the reflective surface, the attenuated light preferably returns through the linear polarizer a second time, such that its intensity is attenuated twice by the extinction ratio. Additionally, this wavelength selective optical switch may preferably also comprise at least one linear polarizing element disposed in the path of the light beams before impingement on the polarization rotation element. In all of these last mentioned embodiments, the wavelength components of the two light beams reflected back through the polarization rotation element are preferably output from the switch through the second birefringent element in accordance with the control signal applied to the at least one pixel associated with the wavelength components.

The switch may also preferably comprise a circulator disposed at the first input port, in which case those wavelength components of the two light beams reflected back through the polarization rotation element having their polarization direction unrotated by the at least one pixel are directed back to the circulator, such that light incident at the first input port is directed back to the circulator or to the first output port, according to the control signal applied to the pixel. In such a case, and according to another preferred embodiment of the present invention, the switch may also preferably comprise a second circulator disposed at the first output port, such that the first output port can add or drop an optical signal. The dispersive element may preferably be a high efficiency grating.

In accordance with yet ore preferred embodiments of the present invention, in any of the above described switch embodiments incorporating a reflective surface, the control signal applied to the pixel is preferably such as to rotate the direction of the polarization of light passing through the pixel through essentially 45°. Furthermore, the reflective switch embodiments may also preferably comprise a birefringent wedge in front of the reflective surface, with the birefringent wedge aligned at an angle such that only wavelength components of a predetermined polarization are directed at the reflective surface at normal incidence, and are reflected back along their incident path. Alternatively and preferably, the reflective surface itself may preferably comprise a birefringent wedge having a reflective coating on one surface, the wedge being aligned such that only wavelength components of a predetermined polarization impinge the reflective coating at normal incidence and are reflected back along their incident path.

There is further provided in accordance with yet another preferred embodiment of the present invention, a method of constructing a reflective wavelength selective optical switch, comprising the steps of:
(a) providing a wavelength selective optical switch utilizing a pixelated polarization rotation element to select a wavelength component of an optical signal to be switched by rotation of the direction of polarization of the wavelength component impinging on a pixel of the polarization rotation element,
(b) disposing a birefringent wedge after the polarization rotation element, such that the wavelength component of the optical signal passing through the birefringent wedge is deviated at an angle dependent on the polarization direction of the wavelength component, and
(c) providing a reflective surface after the birefringent wedge, aligned such that only if the wavelength component has a predetermined polarization, does it impinge on the reflective surface at normal incidence, and is reflected back along its incident path.

In the above-mentioned method, the reflective surface is preferably provided either on a reflective element distinct from the birefringent wedge, or by means of a coating on a surface of the birefringent wedge itself.

In accordance with still another preferred embodiment of the present invention, there is also provided a method of constructing a reflective wavelength selective optical switch, comprising the steps of:
(a) providing a wavelength selective optical switch utilizing a pixelated polarization rotation element to select a wavelength component of an optical signal to be switched by rotation of the direction of polarization of the wavelength component impinging on a pixel of the polarization rotation element,
(b) disposing a linear polarizer element after the polarization rotation element, such that transmission of the wavelength component of the optical signal passing through the linear polarizer element is dependent on the polarization direction of the wavelength component, and
(c) disposing a reflective surface after the linear polarizer element, such that only if the wavelength component has a predetermined polarization is it reflected back along its incident path. In this method, the linear polarizer element disposed after the polarization rotation element is preferably operative to increase the blocking ratio of the switch.

There is further provided in accordance with still another preferred embodiment of the present invention, a wavelength selective optical switch, comprising:
(a) a first birefringent device for receiving input light having a plurality of wavelength components, the device adapted to decompose the input light into two light beams having predefined polarizations,
(b) a first dispersive element receiving the two light beams having predefined polarizations, and dispersing different wavelength components of the light beams,
(c) a first at least one optical element for focusing the dispersed wavelength components of the two light beams of predefined polarizations onto a focal plane,
(d) a polarization rotation element located essentially at the focal plane, the polarization rotation element being pixelated generally along the direction of the dispersion such that separate pixels are associated with separate wavelength components of the light beams, at least one pixel of the polarization rotation element being operative to rotate the polarization of light passing through the pixel according to a control signal applied to the pixel,
(e) a reflective surface disposed in proximity to and after the polarization rotation element, the reflective surface being aligned such that the light beams are reflected back through the pixel and along output paths spatially distinct from the paths of incidence of the light beams, and
(f) an output section for outputting the light, the output path comprising at least one polarization selective device receiving the light beams after passing through the pixel, and transmitting only light having a predetermined polarization, such that transmission of the light beams is determined by the control signal.

In the last-described switch, where the light beams are reflected back along output paths spatially distinct from the incident paths, the output section for outputting the light preferably comprises at least one optical element for collimating the output light beams and a dispersive element operative for combining the separate wavelength components of the light beams into multi-wavelength output light, and the polarization selective device is preferably a second birefringent device for combining the two light beams into one beam for output. The at least one optical element in the output section may preferably be common with the first at least one optical element. Likewise, the dispersive element in the output section may preferably be common with the first dispersive element.

In addition, such a switch in which the input light beams are reflected back along output paths spatially distinct from the incident paths, may also preferably comprise a beam expanding device disposed before the first dispersive element, for expanding the two light beams having predefined polarizations in a predetermined plane, in which case the first dispersive element is preferably aligned such that different wavelength components of the expanded light beams are dispersed in the predetermined plane. The output section for outputting the light then also preferably comprises a beam expanding device aligned such that the multi-wavelength output light beams are compressed in the predetermined plane. In such a case, the beam expanding device in the output section may preferably be common with the first beam expanding device.

In accordance with still another preferred embodiment of the present invention, in a wavelength selective optical switch in which the input light beams are reflected back along output paths spatially distinct from the incident paths, the first birefringent device may preferably be such as to decompose the input light into two light beams having the same polarization direction. The switch may then preferably also comprise at least one linear polarizing element. Furthermore, the switch may also preferably comprising a polarized beam splitter disposed between the beam expanding device and the polarization selective device, such that the polarized beam splitter directs light incident thereon from the pixel of the polarization rotation element either to the polarization selective device, or to a separate port, according to the control signal applied to the pixel.

There is even further provided in accordance with another preferred embodiment of the present invention, a wavelength selective optical switch as described above, in which the incident and output beam paths are spatially distinct, and wherein the first birefringent device and the second birefringent device have optical axes, and wherein the birefringent devices are preferably arranged with their optical axes mutually convergent, such that beams birefracted in the birefringent devices converge. Alternatively and preferably, in such a switch, the birefringent devices may preferably be arranged with their optical axes mutually divergent, such that beams birefracted in the birefringent devices diverge.

There is also provided in accordance with a further preferred embodiment of the present invention, a wavelength selective optical switch as described above, in which the incident and output beam paths are spatially distinct, and in which the first birefringent device is preferably such as to decompose the input light into two light beams having different polarization directions.

In any of the above-described wavelength selective optical switches having spatially distinct input and output beam paths, the input and output paths may preferably be aligned such that their common plane is perpendicular to the dispersion plane. Alternatively and preferably, the reflective surface may be aligned such that the output paths and the paths of incidence of the light beams are disposed in the dispersion plane.

In accordance with yet another preferred embodiment of the present invention, in any of the above-described wavelength selective optical switches having spatially distinct incident and output light paths, at least one of the input light and the output light are preferably respectively input to or output from the switch by means of a fiber optical collimator. Furthermore, the input light may preferably be input to the switch and the output light output from the switch by means of a dual collimator. In the latter case, the switch also preferably comprises a roof prism downstream of the dual collimator.

In accordance with yet more preferred embodiments of the present invention, in any of the above described switches which incorporate beam expansion, either the beam expanding device or the beam compressing device or both may preferably be any one of a pair of anamorphic prisms, a single prism, and a cylindrical lens telescope system. In such a case, at least one surface of at least one of the prisms, where present, preferably has a low polarization dependent loss anti-reflection coating.

Additionally, in any of the above-described wavelength selective optical switches, the at least one optical element for focusing the dispersed wavelength components of the light beams onto a focal plane may preferably be the dispersive element itself.

Finally, in any of the previously described wavelength selective optical switch embodiments, the polarization rotation element may preferably be a liquid crystal cell.

In accordance with further preferred embodiments of the present invention, there is also provided an optical system comprising a bi-directional optical module having a first and a second port and a circulator at each of the first and second ports, such that the optical system can be used for two separate unidirectional circuits. At least one of the circulators is preferably a three-port circulator. The optical module may preferably be any one of a wavelength selective optical switch, a channel blocker, a dynamic gain equalizer or a filter.

BRIEF DESCRIPTION OF THE DRAWINGS

The present invention will be understood and appreciated more fully from the following detailed description, taken in conjunction with the drawings in which:

FIG. 1B shows the result for those embodiments where linear beam expansion is used, and FIG. 1C shows the result for those embodiments where beam expansion is not used;

FIGS. 4A and 4B are schematic illustrations of alternative preferred methods of generating the desired beam expansion for the switch of the present invention; FIG. 4A is a schematic illustration of the anamorphic prism pair of the preferred embodiment shown in FIG. 1A, and FIG. 4B shows a cylindrical lens telescope for preferably performing the beam expansion;

FIG. 4C is a schematic illustration of an embodiment using high efficiency gratings, and FIG. 4D illustrates another embodiment in which gratings having low polarization dependent losses (PDL) are used;

in FIG. 5G, the reflective mirror is a separate component, and in FIG. 5H, the reflective mirror is coated directly on the rear surface of the wedge;

FIGS. 7 to 12C are schematic illustrations of alternative reflective embodiments of the switch configurations of the present invention, in which the input and output beams are spatially separated from each other by means of reflection from the mirror surface at an angle other than normal incidence, such that the input and output beams are handled along different paths;

FIG. 7 is a schematic illustration from the top of a multiple channel wavelength selective switch module using C-polarizers and a high efficiency grating in a two level configuration, showing alternative 1×1 and 1×2 configurations;

FIG. 9 is a schematic illustration of a 1×1 reflective multiple channel, two level wavelength selective switch module, similar to the two level embodiment of FIG. 7, but using a pair of birefringent crystals instead of the C-polarizers of FIG. 7, and a low PDL grating instead of the high efficiency grating of FIG. 7;

FIGS. 10A and 10B show the two alternate switched positions of the switch;

FIG. 12C is a schematic view from the top of a preferred embodiment of a side-by-side switch, showing the complete optical configuration from input to output;

DETAILED DESCRIPTION OF PREFERRED EMBODIMENTS

Figure 1A:
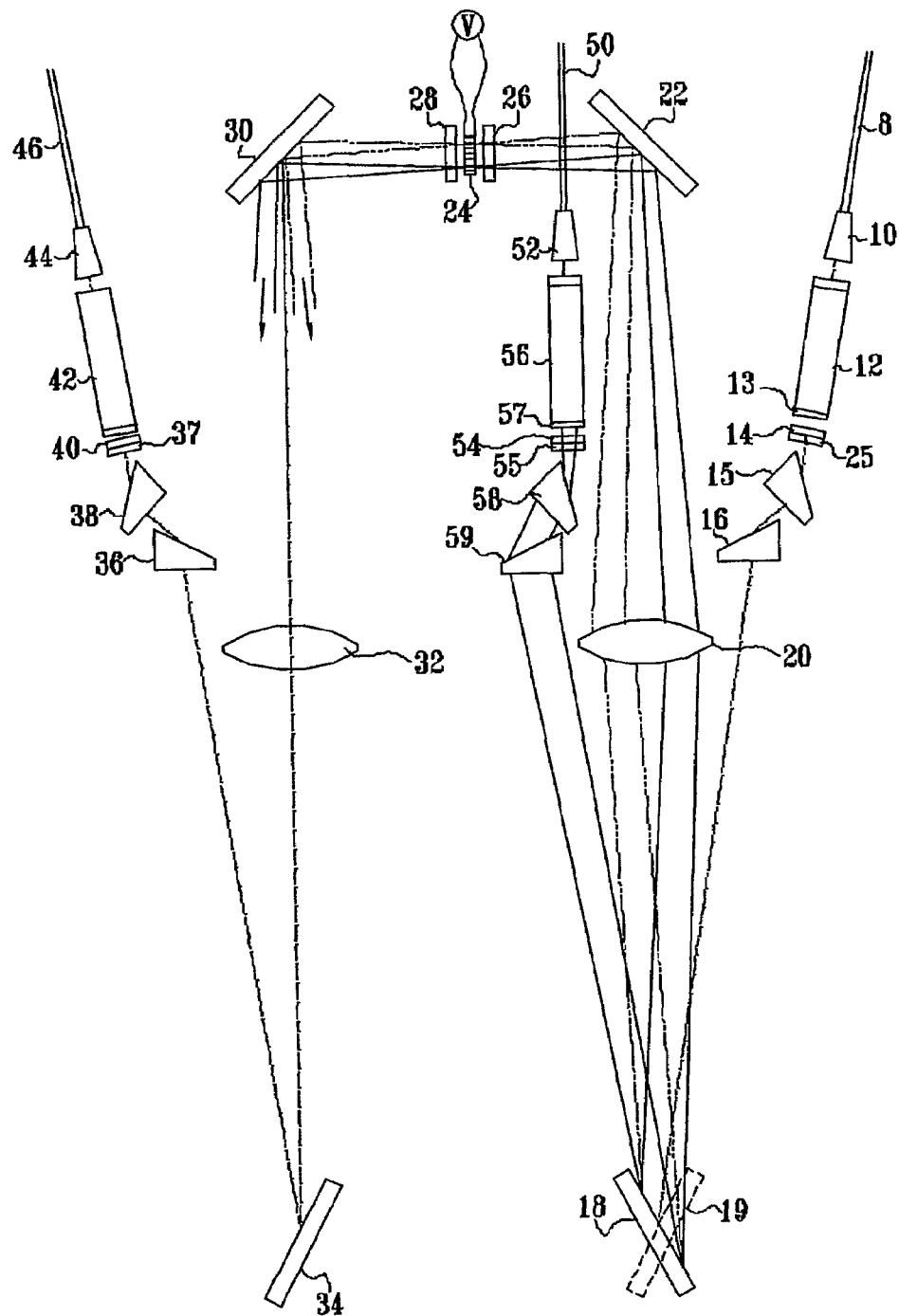
FIG. 1A schematically illustrates a single-pole, wavelength selective optical switch, constructed and operative according to a preferred embodiment of the present invention.

Reference is now made to FIG. 1A, which illustrates schematically a fiber optical, single-pole, wavelength selective optical switch structure, similar in structure to that described in co-pending PCT/IL2003/001002, but having a number of differences, according to preferred embodiments of the present invention. Such a switch is known as a 1×1 switch, since it can switch a single input channel to a single output channel. The shown preferred switch structure can also be operative as a wavelength selective variable optical attenuator. Since the switch structure is wavelength selective, it can switch or attenuate preselected desired wavelengths, such that it can operate as a variable channel blocker or attenuator in an optical information switching or routing network.

The preferred embodiment shown in FIG. 1A is first described using essentially linearly polarized light in its switching or attenuating operative sections. The signal to be switched or attenuated is input through an input fiber 8 to a collimator 10, and from there, preferably to a C-polarizer 12, such as is commercially available from JDSU-Casix Corp., of Fuzhou, China. The C-polarizer preferably comprises a birefringent crystal such as $YVO_4$, which is operative to split the input signal into its two orthogonal S- and P-polarization components. In the embodiments described in co-pending PCT/IL2003/001002, a half wave plate is disposed on the relevant half of the crystal's output port which rotates the P-polarization component, such that both beams exiting the C-polarizer have the same polarization direction, namely S-polarization, which, for the purposes of the description of this preferred embodiment, is defined as being in the plane of the drawing. The result is the generation of two spatially-displaced, S-polarized beams derived from the input signal, independent of the instantaneous direction of polarization of the light at the point of entry into the switch. This result is important since the polarization direction of an optical signal after transmission down a fiber is generally unknown. The ratio of the intensities of the two spatially-displaced S-polarized components will, however, be dependent on the entry polarization direction, but this dependency is generally unimportant, since the switch of the present invention operates by utilizing the sum of both of the components, and not the individual component beams separately. According to further preferred embodiments of the present invention, instead of the C-polarizer 12 with a half wave plate at its output, a conventional birefringent crystal, such as a $YVO_4$ beam walk-off crystal, can preferably be used in the embodiment of FIG. 1A, to split the light polarization into S- and P-polarized beams. This preferred embodiment will be further described in relation to FIG. 4D hereinbelow.

The extinction ratio of the C-polarizer 12 is generally of the order of 30 dB. In order to increase the extinction ratio, a linear polarizer 14, such as a Polarcor™ element available from Corning Inc., of Corning, N.Y., USA, can be optionally disposed at the output of the C-polarizer, aligned parallel to the S-polarization direction of the light exiting the C-polarizer, to reduce even further the non-preferred P-polarization component. As will be seen hereinbelow from the description of the mode of operation of the switch, the higher the extinction ratio, the higher the on/off ratio attained by the switch.

According to a preferred embodiment of the present invention, the S-polarized light beams are now directed to a laterally magnifying beam expander, operative to expand the beam in a plane parallel to the plane of the drawing, but not significantly in the direction perpendicular to the plane of the drawing. An anamorphic prism pair 15, 16 is preferably utilized. The preferred use of an anamorphic prism pair to achieve magnification in one direction, rather than, for instance, a cylindrical lens telescope or a single prism is advantageous when price and ease of alignment considerations are taken into account. A single prism embodiment has the disadvantage that it results in an output beam which is not parallel to the input beam and with a relatively low magnification. In comparison with the cylindrical lens telescope solution, to be described hereinbelow, the two prism solution is advantageous since the incident angle on such a prism pair can be made close to the Brewster angle, at which the P-polarization component transmits through the prism pair with much lower efficiency than it would through a cylindrical lens telescope. This thus improves the overall system blocking effect compared to a system using a cylindrical lens telescope.

The broadened beams are then directed to a grating 18, which is operative to disperse the light beams in the plane of the drawing into its separate wavelength components. The use of beams broadened in the direction perpendicular to that of the direction of the grating rulings enables the attainment of a higher resolving power, and thus increases the wavelength resolution of the switch, allowing it to work with denser DWDM systems, such as those with 50 GHz channel spacing and closer. The grating is preferably operated in an order selected to have both maximum efficiency and the required level of dispersion, whether a low order simple grating, or a higher order echelle grating. The grating is aligned such that the range of dispersed wavelengths to be switched are diffracted back through an imaging lens 20. The grating is preferably selected to be of the high efficiency type, having a high diffraction efficiency for the S-polarization direction, and a low efficiency for the P-polarization component, such that the extinction ratio of the module is increased yet further, though it is to be understood that the switch would also operate with a polarization independent grating.

Alternatively and preferably, a grating with high efficiency for the P-polarization can also be used. In this case, it would be possible to use a cylindrical lens telescope for the lateral beam expansion, as described and illustrated hereinbelow in connection with FIG. 4B, rather than an anamorphic prism pair, since the P-polarization transmits with higher efficiency through the cylindrical lens than through the anamorphic prism pair, for the reason stated hereinabove.

Alternatively and preferably, the grating can be rotated to position 19, in which it operates in a negative order mode. In this case, the input module comprising the input fiber 50, a collimator 52, a C-polarizer 56, a linear polarizer 54 and a pair of anamorphic prisms 58, 59, can be located inboard of the optical axis between the grating 19 and the imaging lens 20, thereby reducing the lateral width of the complete switch module. In FIG. 1A, the paths of the light beams from this inboard input module are shown in a schematic expanded state, and also showing a schematic chromatic dispersion from the grating 19, while for the outboard input module, from input fiber 8, only the optical axis is drawn, to maintain clarity in the drawing.

In FIG. 1A are depicted two dispersed beams from grating 18 or 19, to represent two of the generally many wavelength components of the input light signal. One dispersed wavelength is shown as a dashed line, and the other as a full line. The dispersed beams are focused by the lens 20, onto the plane of a polarization rotation device 24, preferably a liquid crystal cell. Although in the preferred embodiment of FIG. 1A, the imaging lens, and its complementary collimating lens 32, to be described below, are shown as a single lens, it is to be understood that the function of either of these lenses can also be fulfilled by any optical element having the required optical power, whether of single element construction, as in FIG. 1A, or of multiple element construction. It is thus to be understood that the term optical element as used and as claimed in this application, includes not only the single lens embodiments shown in FIG. 1A, but also more composite elements which perform the desired focusing or collimating functions required.

Use of a liquid crystal cell as a particularly convenient form of polarization rotation device, is not meant to be limited to a single liquid crystal cell. It is to be understood throughout this application that the term "liquid crystal cell" is also meant to cover the many variations or combinations of liquid crystal cells and wave plates, operable as polarization rotation devices. These different variations or combinations are generally used in one or the other of the various preferred embodiments of the switches of the present invention, as described hereinbelow. Though the list following is not intended to limit the possible embodiments to be understood by the term "liquid crystal cell" or "liquid crystal element", some common preferred examples of such variations and combinations include:

(a) a single cell having an unactivated birefringence of nominally half a wavelength, resulting in what is known as a normally gray configuration;

(b) a single cell together with an additional half wave plate, such that the combination has an unactivated birefringence of zero, resulting in a normally white configuration;

(c) a pair of cells serially arranged, such as is described in the co-pending PCT Application PCT/IL2004/000389 for "Optical Devices with Cascaded Liquid Crystal Elements", having an unactivated birefringence of zero, resulting in a normally white configuration;

(d) a pair of cells serially arranged, such as is described in the above-mentioned PCT Application, together with an additional half wave plate, such that the combination has an unactivated birefringence of half a wave, resulting in a normally gray configuration because of the wavelength dependence of the HWP.

The above described variations and combinations are relevant for transmissive applications where the polarization rotated beam passes through the liquid crystal only once. For reflective embodiments, where the polarization rotated beam passes through the liquid crystal twice, it is understood that references in the above list to half-wavelengths are to be replaced by quarter-wavelengths.

The polarization rotation device is preferably pixelated in the direction of the wavelength dispersion, such that different dispersed wavelengths fall on each of the different pixels of the device, as shown in FIG. 1A. When a first appropriate drive voltage, V, is applied to a pixel, preferably by means of transparent Indium Tin Oxide (ITO) electrodes coated on the faces of the device, as is known in the art, the polarization of light passing through that pixel is rotated, preferably through 90° from S- to P-polarization, the effect of which will be explained hereinbelow. When a second appropriate voltage is applied to that pixel, light passes through with its S-polarization unchanged.

After passage through the liquid crystal cell 24, the polarization-modulated beams pass through the output side of the switch module, which preferably has elements complementary to those on the input side. The output side of the module thus preferably comprises a folding mirror 30, a complementary imaging lens 32, preferably spaced at a distance 2 f from the input focusing lens 20, as is known in the art to provide optimum optical transfer characteristics to the imaging lens pair 20, 32, a diffraction grating 34 operative to receive and recombine dispersed light of the desired wavelengths, an anamorphic prism pair 36, 38, operative to collimate the laterally expanded beams into a pair of collimated essentially symmetrical beams (in those preferred embodiments where lateral beam expansion is used in the switch), a C-polarizer 42 at one of its input ports receiving this pair of collimated beams and outputting a single combined beam, and a collimator 44 feeding this single output beam into the output fiber 46. As on the input side, the output fiber and its associated components can be disposed inboard of the line joining the diffraction grating 34 to the collimating lens 32, by using the minus one order of diffraction of the output grating 34, or another negative order. Generally, in order to maintain the symmetry of the module, both the input and output gratings are preferably operated at the same order. The grating-to-grating distance is preferably 4 f, to provide optimal optical transfer efficiency, as is known in the art. In order to increase the extinction ratio even more, a linear polarizer 40, aligned with its polarization direction parallel to the plane of the drawing can be disposed before the output C-polarizer 42, such that light of a wavelength having a P-polarization direction is blocked from being transmitted through the polarizer.

The attenuation of the switch in the OFF state is determined by the overall extinction ratio (ER) between the two perpendicular S- and P-polarizations. This overall extinction ratio results from the combination of the C-polarizer ER, the grating ER, the prism ER and module alignments. Light of wavelengths whose polarization was not rotated in the liquid crystal cell, passes through the optional linear polarizer 40 and the output C-polarizer 42 virtually unattenuated, and the switch thus remains in its ON state for that particular wavelength. The only reduction in the transmitted signal then arises from the switch's insertion loss. The drive circuits of the pixels of the liquid crystal element can thus be programmed by the communication or information control system, in order to pass or block different wavelengths at different instants in time, according to the operational requirements of the system.

Besides the linear polarizers 14, 40 located close to the outputs of the C-polarizers 12, 42, additional linear polarizers 26, 28 can be preferably disposed on either side of the liquid crystal cell 24 to increase the extinction ratio even more. If the liquid crystal cell is of the commonly used nematic crystal type and the rubbing direction is at 45° to the polarization direction of the light traversing it, then when the voltage across a pixel is set for maximum attenuation (i.e. blocking), the phase difference undergone by the light during passage through the pixel is $\pi$ On the other hand, when the voltage is adjusted to reduce the birefringence, the phase change through the cell tends to 0, and the insertion loss becomes minimal. Any alternative type of liquid crystal element known in the art may also be preferably used, the primary requirement being the ability to generate polarization changes in the light which can then be analyzed at the output side of the switch structure to provide overall transmission or blocking functions.

In order to decrease the package footprint, in passage between the focusing lens 20 and the polarization rotation cell 24, the beam is preferably folded by means of the reflector mirror 22, and likewise by mirror 30 on the output path side of the cell 24. Other folding mirrors can also be used elsewhere in the module where appropriate, in order to decrease the module size even more.

When the switch structure shown in the preferred embodiment of FIG. 1A is to be used as an attenuator, the drive voltages V applied to the various pixels of the polarization rotation device 24, are arranged to provide other than 90° polarization rotation, such that the desired level of attenuation of the optical signal which traverses that pixel is obtained at the output, as explained hereinabove.

Furthermore, when the linear polarizer elements 14 and 40 (or 54 and 40) are preferably replaced by quarter wave plates, the light is converted into a circularly polarized beam, and the switch or attenuator structure of FIG. 1A is operable by changing the direction of rotation of the circular polarization of the light passing through each pixel of the liquid crystal device 24, as expounded hereinabove. Alternatively and preferably, additional quarter wave plates 25, 37 (or 55, 37), are added respectively after and before the above mentioned linear polarizers 14, 40, resulting in a more perfect circular polarization output, since the input to the quarter wave plates are more completely linearly polarized. In such embodiments, linear polarizers 26, 28 would not be necessary.

Figure 1B:
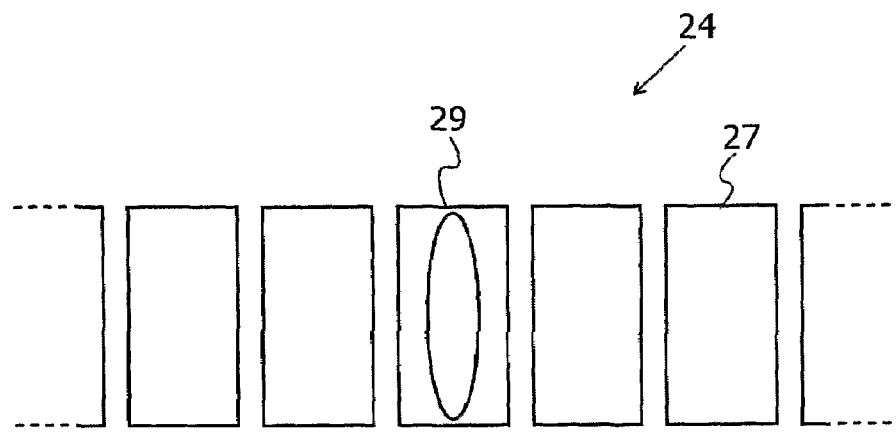
FIGS. 1B and 1C are schematic diagrams showing the focused input beam of the switch of FIG. 1A impinging on the different pixels of the pixelated polarization rotation device.

Reference is now made to FIG. 1B which is a schematic diagram showing, for those preferred embodiments where linear beam expansion is used, a focused beam impinging on the different pixels 27 of the pixelated polarization rotation device 24. Because of the larger effective numerical aperture of the focusing lens 20 along the direction of the beam expansion, which is also the wavelength dispersion direction, the input beam is focused down to an elongated spot 29, narrower in the dispersion direction than in the orthogonal direction. The width is smaller than the pixel size, such that clear delineation between pixel and pixel is enabled. The higher the degree of linear beam expansion, the narrower the focused spot in the direction of wavelength dispersion, and hence, the higher the bandwidth of each channel of the switch. The use of directional beam expansion, according to this embodiment of the present invention, enables a significant improvement too be made in wavelength resolution of such switch embodiments, thus enabling good channel to channel discrimination to be achieved, even for dense channel spacing system use.

Figure 1C:
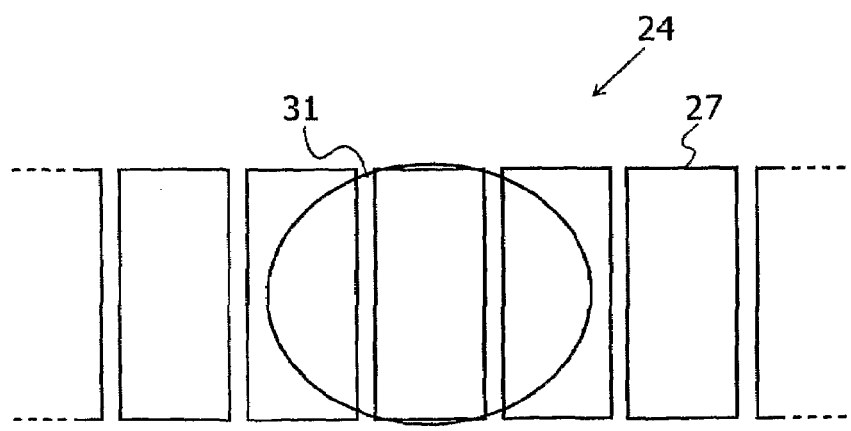

According to further preferred embodiments of the present invention, and as previously mentioned in the summary section of this application, any of the wavelength selective switches described in the present application can also preferably be operated without use of the lateral beam expander 15, 16, shown in the embodiment of FIG. 1A. Reference is now made to FIG. 1C which is a schematic diagram showing, for such embodiments without beam expansion, the focused beam impinging on the different pixels 27 of the pixelated polarization rotation device 24. Because of the small effective numerical aperture of the focusing lens 20, the input beam is focused to a spot 31, whose size is significantly larger than the pixel size, such that it covers more than a single pixel of the pixelated polarization rotation device. Pixel-to-pixel discrimination is not then enabled. However, the wavelength resolution of such a switch embodiment is generally sufficiently good for use in those applications where discrete channel separation is not required, such as in dynamic gain equalization applications, where there is need to produce wavelength selective switching or attenuation changes only gradually over a number of channels, and not from channel to channel or between adjacent channels. The elimination of the beam expansion components 15, 16, and of the corresponding beam compression components 36, 38, enables the cost of such devices to be reduced, in comparison to the higher resolution devices utilizing the beam expansion/compression components. An alternative and even less costly embodiment can be attained by use of a polarization rotation device having larger pixels, which are sufficient to provide the resolution required by applications such as dynamic gain equalization.

Figure 2A:
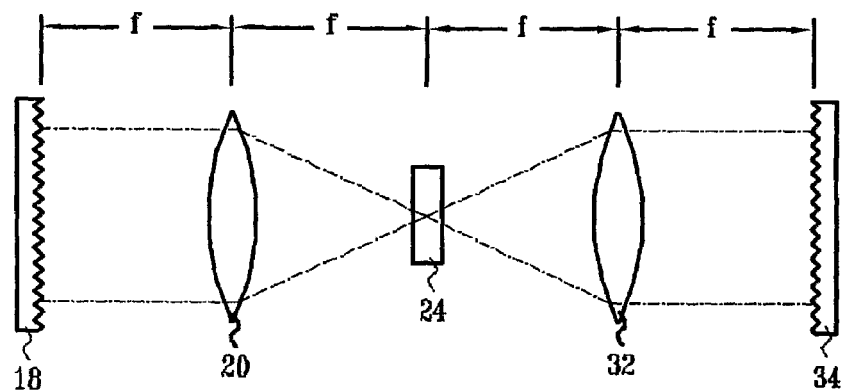
FIGS. 2A and 2B are schematic side sectional views of the optical path of the dispersed beam through part of the preferred embodiment shown in FIG. 1A, showing alternative and preferred focusing arrangements for the switch.

Reference is now made to FIG. 2A, which is a schematic side sectional view of the plane perpendicular to the direction of dispersion of the optical path of the dispersed beam between the dispersing grating 18 and the collecting grating 34 of the preferred embodiment shown in FIG. 1A, illustrating the way in which the light is focused onto and imaged from the liquid crystal element 24 by means of a pair of lenses 20, 32, each preferably spaced a distance f, the focal length of each lens, from the liquid crystal element. The components have the same reference characters to those used in FIG. 1A. The distance between the two gratings is preferably designed to be 4 f, as known in the art to provide the best coupling, as previously mentioned.

Figure 2B:
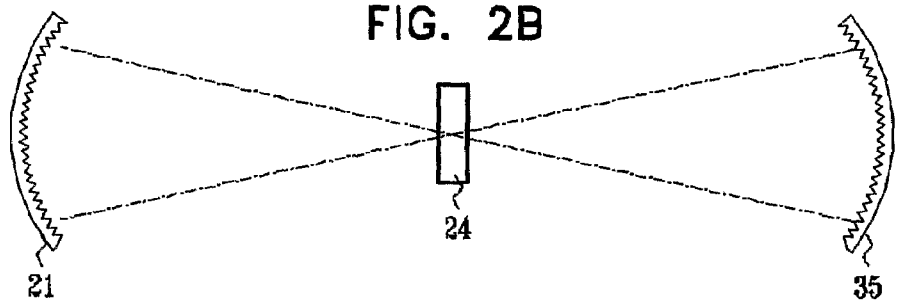

Alternatively and preferably to the use of lenses to perform the focusing of the wavelength components of the dispersed light onto the polarization rotation element and the imaging of the light therefrom, concave gratings can be used for one or both of these functions. Reference is now made to FIG. 2B, which is a view of the plane perpendicular to the direction of dispersion, illustrating such an embodiment. The concave dispersive grating 21 disperses and focuses the incident expanded light onto the plane of the liquid crystal element 24, and the concave dispersive grating 35 collects the diverging wavelength components of the light after passage through the liquid crystal element 24, and preferably collimates the resulting multiple wavelength beam towards the beam compressor. According to even further preferred embodiments, either one of these functions can be performed by a lens, and the other by use of a concave grating. Although the use of a concave dispersive grating to perform the additional function of focusing or collimating/imaging light passing through the switch, has been described in relation to the embodiment of FIG. 1A, it is to be understood that such a concave grating design can be used in any of the other embodiments described in the present application, and the focusing or collimating/imaging optical element or elements thereby dispensed with.

Figure 3:
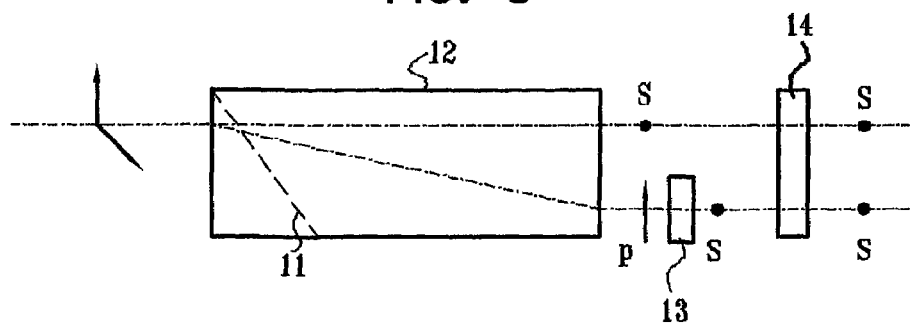
FIG. 3 a schematic illustration of the C-polarizer section of the preferred embodiment shown in FIG. 1A.

Reference is now made to FIG. 3, which is a schematic illustration of the C-polarizer 12 of the preferred embodiment shown in FIG. 1A. The C-polarizer preferably comprises a birefringent beam walk-off crystal such as $YVO_4$ with a half wave plate 13 on the P-polarization side of the output port. An optional linear polarizer 14, incorporated to improve the extinction ratio, and aligned parallel to the S-polarization direction, is disposed in both parts of the output beam. The separate P- and S-polarization components are marked on the two output beams shown in the drawing. The optical birefringence axis 11 is shown at 45° to the direction of the birefracted beam.

Reference is now made to FIG. 4A, which is a schematic illustration of the anamorphic prism pair 15, 16, of the preferred embodiment shown in FIG. 1A, illustrating how the narrow beams of overall dimension d from the C-polarizer are laterally expanded essentially in one direction only to an overall dimension D. The magnification can preferably be, set between ×2 and ×6, or even more, as a function of the prism apex angle, the prism material and the mutual angle between the prisms. The separation between the prisms defines the optical axis shift between the input and output beams. The two beams are preferably made parallel to each other.

Figure 4C:
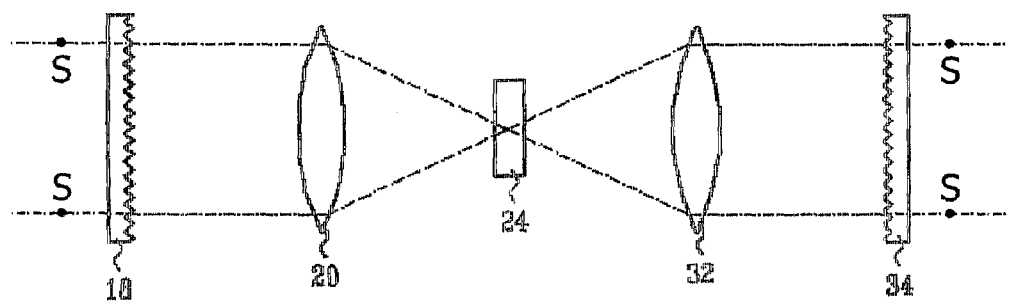
FIGS. 4C and 4D illustrate the effect of switching the preferred types of embodiments shown in FIG. 1A or 2A, where

Reference is now made to FIG. 4B, which is a schematic illustration of an alternative and preferred method of lateral beam expansion, for use in the embodiment of FIG. 1A, using a cylindrical lens telescope system, comprising cylindrical lenses 21 and 23. The narrow beams of overall dimension d from the C-polarizer are laterally expanded essentially in one direction only to an overall dimension D, as shown in the top part of FIG. 4B, while in the perpendicular direction, as shown in the bottom part of FIG. 4B, no expansion is generated. However, an anamorphic prism pair with appropriate polarization-sensitive anti-reflection coatings, can also be advantageously used in this role Reference is now made to FIG. 4C which illustrates the effect of switching the type of embodiments shown in FIG. 1A or 2A. FIG. 4C is a schematic illustration of a switch embodiment similar to that shown in FIG. 2A, and uses the same reference numbers as FIG. 2A for identifying equivalent items in the two drawings. Since high efficiency gratings 18, 34, are preferably used, and such gratings typically have an efficiency of the order of 80% for S-polarization, and 20% for P-polarization, a C-polarizer is used in these embodiments, providing S-polarization outputs. In such an embodiment, if the LCD is such that there is no polarization rotation in passage of the light therethrough, the S-polarization in both beams at the input remains S-polarization at the output, and the switch thus transmits the incident light. If on the other hand, the LCD is such that the cell has a birefringence of close to $\lambda/2$, the S-polarization in both beams is converted to P-polarization, which is not coupled out, and almost complete blockage of the light results.

Figure 4D:
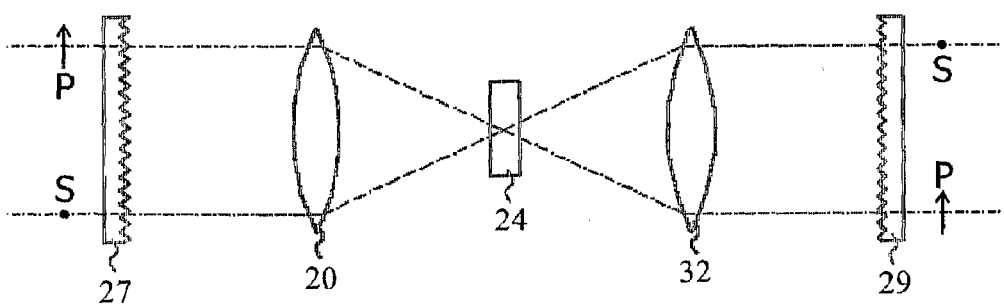

Reference is now made to FIG. 4D which illustrates another preferred embodiment of the present invention, in which gratings 27, 29, having low polarization dependent losses (PDL) are used. Such gratings generally have similar efficiencies for both polarizations, which can be as high as 80% for either polarization direction, and hence are impartial to whether P- or S-polarization is diffracted from them. Instead of the C-polarizer shown in the embodiment of FIG. 3, and in FIG. 4C, a conventional birefringent crystal, such as a $YVO_4$ beam walk-off crystal, can then preferably be used to split the light polarization into S- and P-polarized beams. In such a configuration, when the LCD is such that the birefringence is zero, because of the geometric cross-over of the beams through their focus, the P- and S-polarization beams invert their positions after passage through the LCD cell, and are thus not coupled out of the switch. Therefore, the switch blocks the light The operation of such a switch is shown in more detail below in FIGS. 10A and 10B. In the embodiment of FIG. 4D, the birefringence can be made to be exactly zero, thereby preventing any effects from spoiling complete blocking Reference is now made to FIG. 4E which is a schematic illustration of another preferred embodiment of the transmissive switch configuration of the present invention, viewed in the plane perpendicular to the plane of dispersion. This embodiment differs from those shown in the previous transmissive embodiments, in that the beam is folded back onto itself preferably by means of a pair of reflective surfaces 95, 98, such that this transmissive switch has a particularly compact construction. A dual fiber collimator 84 is preferably used to separate the input signal fiber 83 from the output signal fiber 99. The output beam 87 from the dual fiber collimator 84 is preferably input to a beam bending device, such as a roof prism 88 as preferably shown in the embodiment of FIG. 4E. This prism is operative to refract the beam 87 in order to correct its deviation from the optical axis of the system on exit from the dual fiber collimator. This deviation is purposely exaggerated in FIG. 4E to illustrate the operation of the roof prism 88. Alternatively and preferably, separation of the input and output signals can be performed using two single fiber collimators, one feeding the input C-polarizer, and the other being fed by the output C-polarizer. Such an input/output arrangement is shown hereinbelow in relation to the embodiment of FIG. 7. The input beam then preferably enters a C-polarizer 89, such that both of the output beams have S-polarization direction. The light then passes through an optional linear polarizer 91, aligned to transmit light of S-polarization, and thereby to increase the extinction ratio of the switch, and is then laterally expanded, preferably by means of an anamorphic prism pair 92. Since the lateral expansion direction is perpendicular to the plane of the drawing, it is not apparent in FIG. 4E. The expanded beam of light is then wavelength dispersed, also in the direction perpendicular to the plane of the paper, preferably by means of the grating 94, and is focused by imaging lens 96, after total internal reflection from a 45° surface, such as the hypotenuse face 95 of a right prism, onto a pixelated liquid crystal 97, whose pixelated axis extends perpendicular to the plane of the drawing. Alternatively and preferably, reflection can be achieved using mirrors aligned preferably at 45 deg. to the beam. The lens is arranged such that the light is focused onto the plane of the pixels, different wavelengths falling on different pixels of the element. The pixels are controlled to either rotate or not to rotate the polarization of the light passing through each pixel, from S- to P-polarization, according to whether the wavelength passing through the particular pixel is to be blocked or transmitted.

After passage through the pixelated liquid crystal, the light preferably enters another 45° right prism (or a mirror inclined at 45 deg), is totally internally reflected from its hypotenuse face 98, and is imaged by the lens 96 back into the grating 94, where the dispersed wavelength components are recombined. The expanded beams are then compressed by the anamorphic prism pair 92, and encounter the optional linear polarizer 91, which is operative to block light with rotated P-polarization, or to transmit light with its original unrotated S-polarization. The beams transmitted, having S-polarization, are then recombined in another C-polarizer 90, and directed through the roof prism 88 to the second port 86 of the dual fiber collimator 84, from where the transmitted signals are exited through output fiber 99. In the embodiment shown in FIG. 4E, since the input and output beams are located so close together, single components may preferably be used to respectively perform the functions of the optional linear polarizer 91, the beam expansion 92, beam dispersion 94 and beam focusing 96, for both the incident and the output sides of the liquid crystal element. It is to be understood however, that separate input and output components can equally well be preferably used on the input and output sides.

Figure 4E:
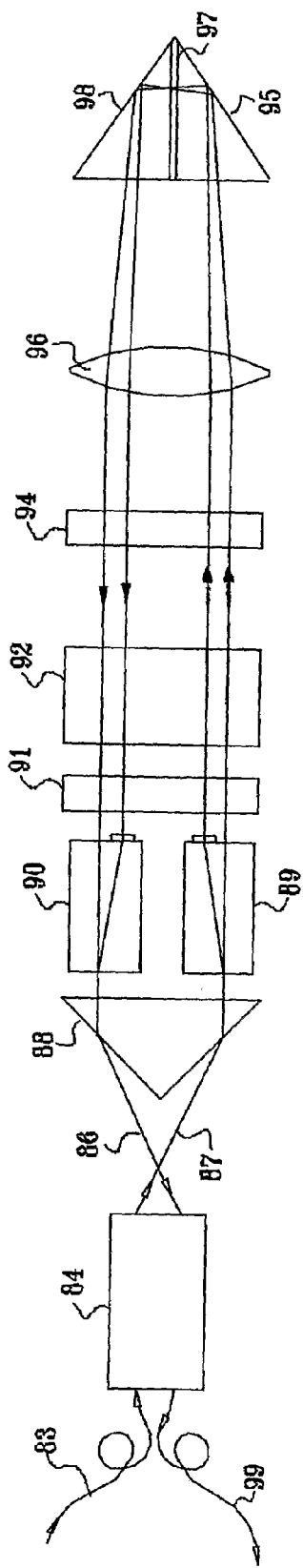
FIG. 4E is a schematic illustration of another preferred embodiment of a transmissive switch configuration, in which the beam is folded back onto itself by means of a pair of reflective surfaces, such that a particularly compact switch is achieved.

The embodiment of FIG. 4E has been described using high efficiency gratings and C-polarizers 89, 90, such that the switching configuration of FIG. 4C is used. It is to be understood that this embodiment can also be constructed to use the switching configuration of FIG. 4D instead. In this case, low PDL gratings are used instead of the high efficiency gratings, and in place of the C-polarizers 89, 90, conventional birefringent elements, such as $YVO_4$ crystals are preferably used to split the input light polarization into S- and P-polarized beams, and to recombine the light beams on the output side of the switch, as explained with reference to FIG. 4D.

In the above described embodiments of the present invention, the light passes by transmission through the switch, from input to output ports, traversing the polarization rotation device only once.

Figure 5A:
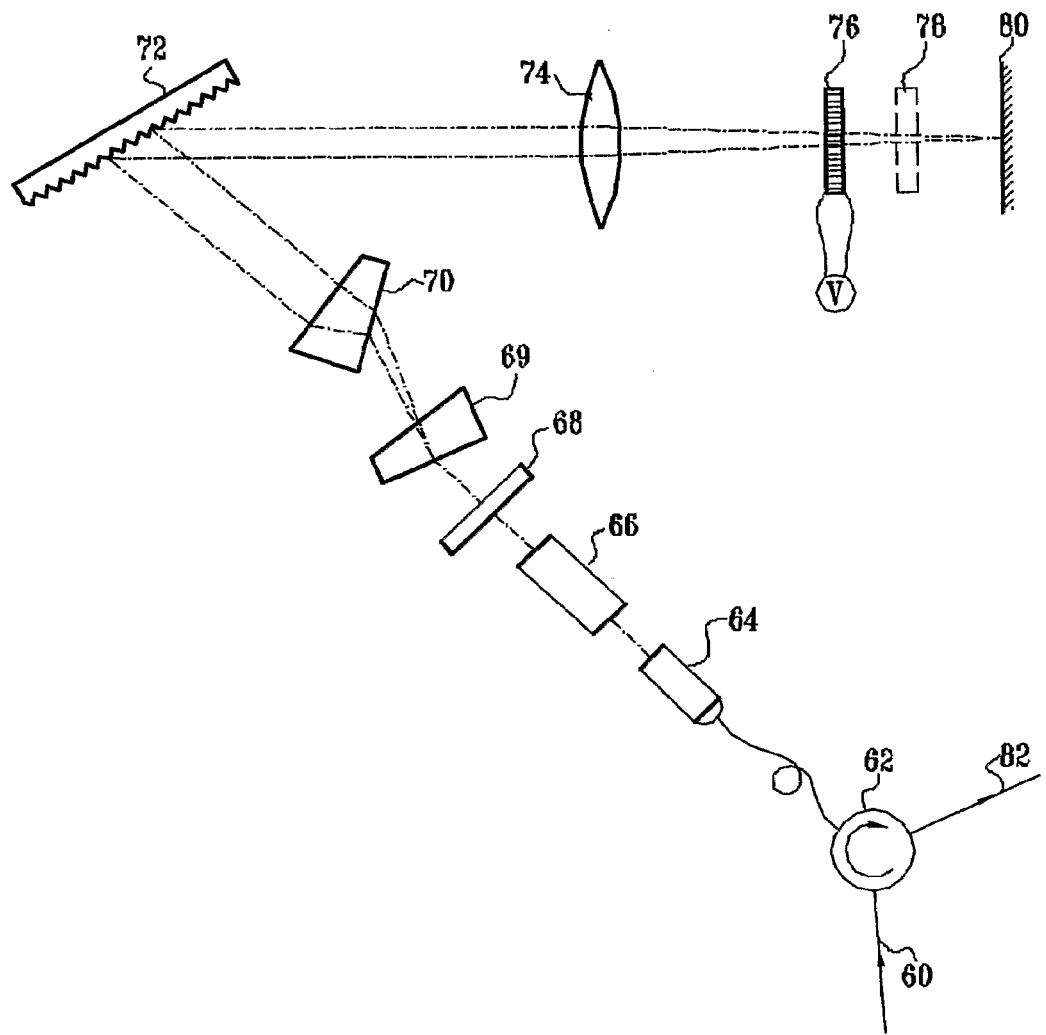
FIGS. 5A and 5B are schematic illustrations of reflective embodiments of the switch according to further preferred embodiments of the present invention, where in FIG. 5A, a circulator is used to separate input and output signals, while in the embodiment of FIG. 5B, a polarized beam splitter is used for this purpose.
Figure 5B:
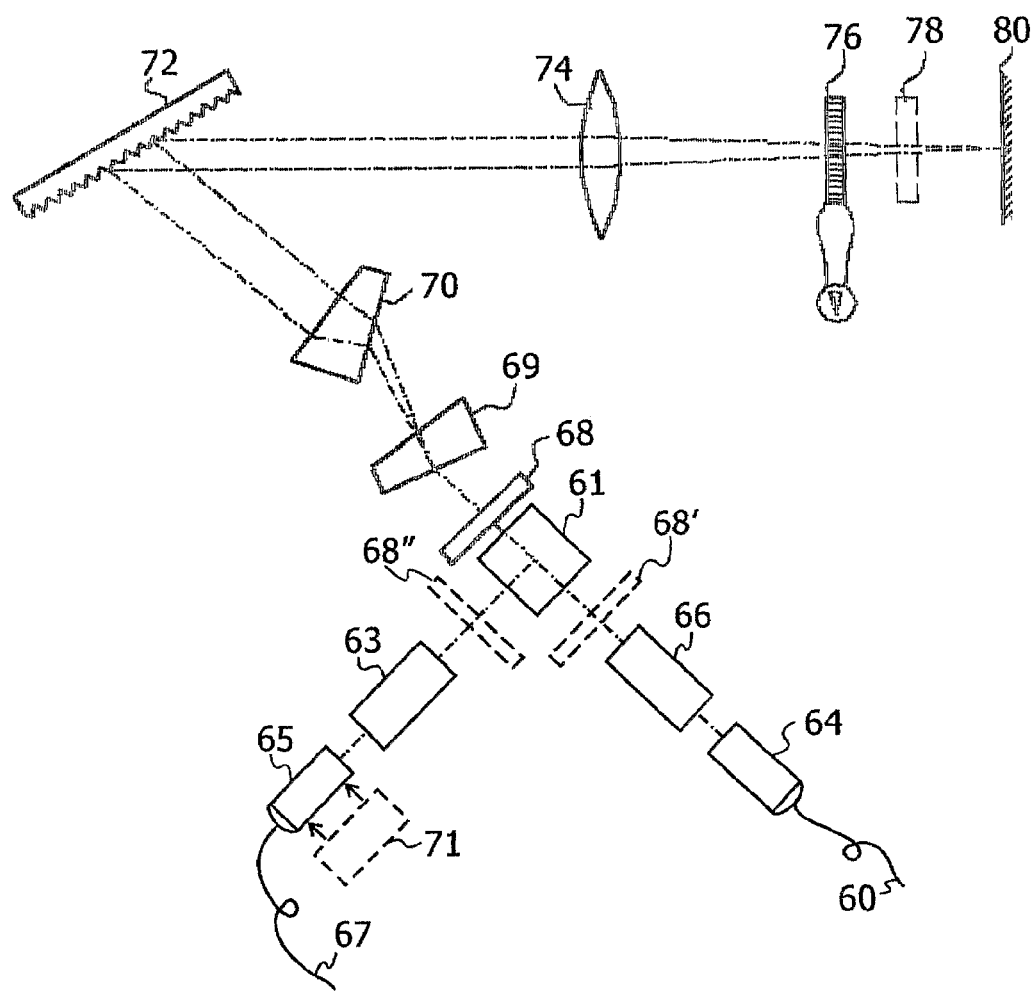

Reference is now made to FIGS. 5A and 5B, which are schematic illustrations of further types of wavelength selective switches, constructed and operative according to more preferred embodiments of the present invention, as viewed from what is known as the top of the switch. These preferred embodiments differ from that shown in the previous embodiments, in that they are reflective embodiments, incorporating a reflective surface which directs the beam to be switched back through the operative pixel, after reflection from the reflective surface. Common components are used for equivalent but reversed or mirror imaged functions on the input and output sides of the switch. In this way, the number of components required to construct the switch is reduced almost to half that of the transmission embodiment shown in FIG. 1A, for instance. However, in these reflective embodiments, where essentially normal reflection is used, an additional component is required at the input/output end of the switch in order to separate the input signal from the switched output signal. In FIG. 5A, this additional component is a circulator, while in the embodiment of FIG. 5B, a polarized beam splitter is used.

In the embodiment shown in FIG. 5A, the input signal 60 is preferably applied through a circulator 62, and a collimator 64, to a birefringent component 66 for decomposing the input signal beam into two beams according to their polarization. The dotted center lines used in FIGS. 5A and 5B are meant to represent the optical axis, and not the individual beams. The birefringent component 66 can be either a C-polarizer to provide output beams of the same polarization, preferably the S-polarization, in which case the operation of the switching configuration is that described in the embodiment of FIG. 4C, or it can be a birefringent beam walk-off element such as a YVO$_4$ crystal, to provide beams of different polarization, S- and P-polarization, in which case the operation of the switching configuration is that described in the embodiment of FIG. 4D. In order to explain the operation of the switch, the preferred embodiment using the C-polarizer will be used, such that the configuration of the switching function will be similar to that shown in FIG. 4C. However, it is to be understood that, with the exception of the cases specifically mentioned below, these reflective embodiments can equally be implemented using a walk-off birefringent crystal such that the configuration of the switching function will be similar to that shown in FIG. 4D.

Furthermore, the birefringent crystal 66 can be such as to have its optical axis aligned so that the birefracted beam is diverted in a direction perpendicular to the direction of dispersion, i.e. perpendicular to the plane of the drawing of FIG. 5A, and the half wave plate located accordingly on the top or bottom of the crystal output face. The two beam components with their specific polarizations are then output from the birefringent crystal lying one on top of the other, in the sense that FIG. 5A is a top view of the switch.

Alternatively and preferably, the optical axis can be aligned so that the birefracted beam is diverted in the direction of dispersion, i.e. in the plane of the drawing of FIG. 5A, and the half wave plate located accordingly on the left or right of the crystal output face. The two beam components with their specific polarizations are then output from the birefringent crystal lying side by side, in the sense that FIG. 5A is a top view of the switch.

These two different configurations for the diversion direction of the birefracted beam components, namely "two level" and "side by side", have important ramifications in terms of the geometrical layout and dimensions of the resulting switches, and these differences are applicable to essentially all of the embodiments described hereinbelow in this application. Details of the resulting switch dimensions for the various configurations are described more fully in relation to FIG. 12D below.

From the C-polarizer, the beams are preferably directed to an optional linear polarizer 68 aligned parallel to the S-polarization direction, and then to an anamorphic beam expansion device, such as a pair of anamorphic prisms 69, 70, which expands the beam in one predefined plane, which in the embodiment of FIG. 5A, is seen to be the plane of the drawing. The beams, laterally expanded by the prism pair in the direction of the plane of the drawing, impinge the grating 72, and the light is dispersed spectrally in the plane of the drawing and directed towards the focusing lens 74. This lens is preferably spaced a distance f, the focal length of the lens, from the reflective surface to provide optimum optical performance, using a 4 f configuration. The lens focuses the beam through the polarization rotation element 76, preferably a pixelated liquid crystal cell. As described hereinabove in relation to the embodiment of FIG. 2B, in place of a focusing lens 74, the grating 72 can be a concave grating such that it performs both the dispersive and the focusing functions required by the reflective embodiment of FIG. 5A. The liquid crystal element 76 is preferably chosen to be such that when a specific pixel is activated by application of the appropriate switching voltage, the liquid crystal cell at that pixel behaves as a quarter wave plate, transforming the linear polarization of the light passing through the pixel to circular polarization. When not activated, no polarization change occurs in passage through the pixel. After passage through the liquid crystal cell, the light impinges on a reflective surface 80 disposed in close proximity to the cell, and is reflected back through the cell. The reflector surface 80 should be disposed as close as possible to the polarization rotation element 76 so that the beam is well focused onto a minimal area of the element pixel both in its forward and return directions. The reflector surface 80 can preferably be made part of the cell by using a suitable coating on the rear surface of the cell, or on an internal surface. The effect of the reflection is to reverse the effective direction of the circular rotation in relation to the propagation direction of the beam, such that on its return path through the pixel, if the pixel is a switched pixel, the circularly polarized light is converted back to linear polarization, but subject to a 90° polarization rotation, from the originally aligned S-polarization to P-polarization. On the other hand, if the pixel is non-switched, the S-polarization is unchanged.

The light then continues, returning along the same path as its incident passage. The C-polarizer 66 this time acts as a blocker to the light of those wavelengths whose polarization was switched to P-polarization in the liquid crystal cell, but allows transmission of the light of those wavelengths with unchanged S-polarization. This transmitted light exits the switch at the circulator 62, from where it is directed to the output fiber 82. As previously, the optionally incorporated linear polarizer 68 is used to increase the extinction ratio of the switch. However, it is to be understood that use of a linear polarizer in the various embodiments of FIG. 5A is limited to those cases where a C-polarizer is used for decomposing the input signal beam into two beams according to their polarization, and not for the cases which use a birefringent beam walk-off crystal. This is evident since when a birefringent beam walk-off crystal is used, there exist two orthogonal polarizations in the switch path up to the polarization rotation element, and only when a single polarization direction is present can a linear polarizer be used to improve the extinction ratio attained relative to one polarization direction.

In the above described embodiment, the liquid crystal cell is chosen to be such that it acts as a quarter wave plate when activated, such that the polarization is rotated a total of 90° by the double passage of the light therethrough. The blocking of the resulting 90° polarization-rotated optical signal after its return passage through the cell, then takes place at the C-polarizer 66, in conjunction with the optional linear polarizer 68, if installed. In this preferred embodiment, the OFF-attenuation level is dependent on the extinction ratio of the C-polarizer 66, together with that of the linear polarizer 68, if fitted.

Alternatively and preferably to the above described arrangement, a linear polarizer, shown as item 78 in dotted outline in FIG. 5A, can be positioned between the liquid crystal cell 76 and the reflective surface 80. In this case, the liquid crystal cell is chosen to be such that it is operated as a half wave plate when activated, such that, when a pixel is activated, the polarization of light passing therethrough is rotated 90° from its forward passage through the cell, from an S-polarization to a P-polarization. The linear polarizer, now in position 78, is aligned parallel to the S-polarization direction, such that it attenuates such a progressing P-polarization forward beam which has passed through an activated pixel, by its extinction ratio. After reflection from the mirror, the returning P-polarized beam again passes through the polarizer 78, where its intensity is again reduced by the extinction ratio, such that the total attenuation is dependent on the square of the extinction ratio of the polarizer 78. The ON/OFF ratio of this preferred embodiment is thus significantly better than that of the embodiment with the linear polarizer 68 located at the output of the C-polarizer 66, or without any linear polarizer at all. This greatly attenuated P-polarized beam again traverses the "half wave plate" activated liquid crystal cell 76, where the very small remnant of P-polarized light remaining after the two traverses of the crossed polarizer 78, is again rotated back to the S-direction, and is returned through the chain of components and out through the exit fiber 82. When a particular pixel is unactivated, such as to leave the polarization direction of the light transmitted therethrough unchanged, then the light retains its S-polarization in its return trip through the switch up to the C-polarizer 66, and eventually exits the switch through fiber 82 attenuated only by the insertion loss of the switch. Such a double-pass embodiment, in which the switch operates as if it were made up of two switches in series, thus increases the blocking ratio of the switch significantly when compared with a transmissive single pass arrangement, such as that shown in FIG. 1A or FIG. 4E.

Reference is now made to FIG. 5B which is a schematic illustration of a further reflective preferred embodiment of the present invention, similar to that shown in FIG. 5A, but using a polarized beam splitter (PBS) 61 to separate the input from the output beams. Since, unlike the circulator embodiment of FIG. 5A, the PBS embodiment requires light of a single polarization direction to operate, the embodiment of FIG. 5B is operable only with a C-polarizer to split the beam into its two components, and not with an ordinary birefringent beam walk-off crystal. However, elements of FIG. 5B equivalent to those shown in the embodiment of FIG. 5A are labeled with the same reference numbers as those of FIG. 5A. The input optical signal 60 is applied directly through a collimator 64 to a C-polarizer 66, preferably designed to provide S-polarization for both parts of the input beam. These are then passed through the PBS 61, shown in the preferred embodiment of FIG. 5B as a double prism, though any other suitable PBS structure may also preferably be used. After traversing the beam dispersing and switching sections of the switch, which are identical to those of FIG. 5A, the reflected output beam reenters the PBS 61. If, for any specific wavelength, the polarization has been rotated to P-polarization by activation of the relevant pixel of the beam polarization rotation element 76, the output beam is directed by the PBS to another C-polarizer 63, designed, unlike the input C-polarizer 66, for P-polarization. From this output C-polarizer 63, the light is directed to an output collimator 65 and to the output fiber 67. Alternatively and preferably, a power meter 71 can be disposed at the output in place of the output collimator 65, in order to monitor the output beam level. In order to improve the blocking, an optional additional linear polarizer 68" can be added between the PBS 61 and the output C-polarizer 63, and another optional additional linear polarizer 68' between the PBS 61 and the input C-polarizer 66.

Besides the above-mentioned limitation of the need to specifically use a C-polarizer, the PBS implementation of FIG. 5B also differs from the circulator embodiment of FIG. 5A in that the PBS switch is a "normally closed" switch, as compared to the "normally open" configuration of the circulator embodiment of FIG. 5A.

Figure 5C:
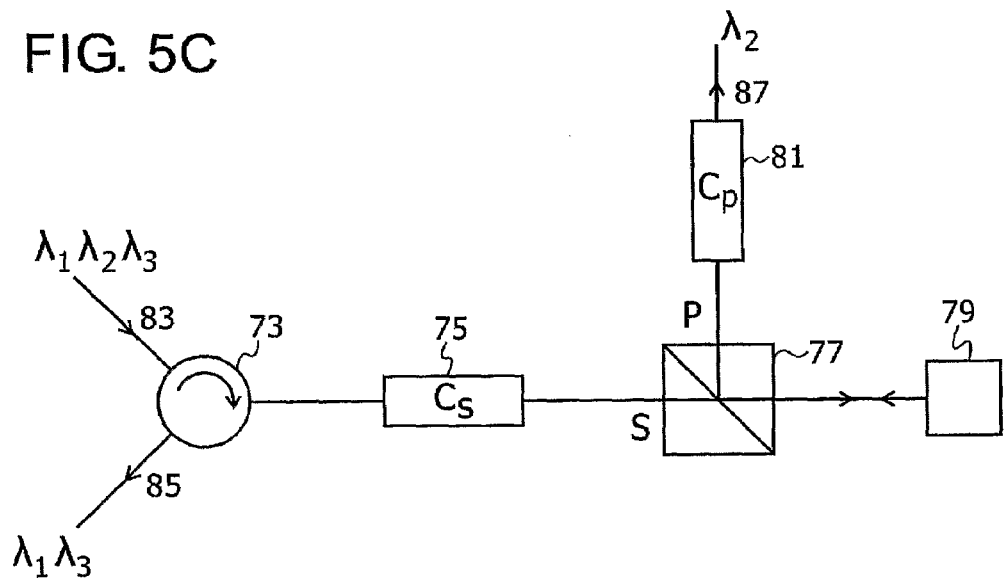
FIG. 5C is a schematic drawing of the input/output region of a reflective switch according to another preferred embodiment of the present invention, in which the addition of a PBS to the embodiment of FIG. 5A, or the addition of a circulator to the embodiment of FIG. 5B, enables a 1×2 wavelength selective switch to be implemented.
Figure 5D:
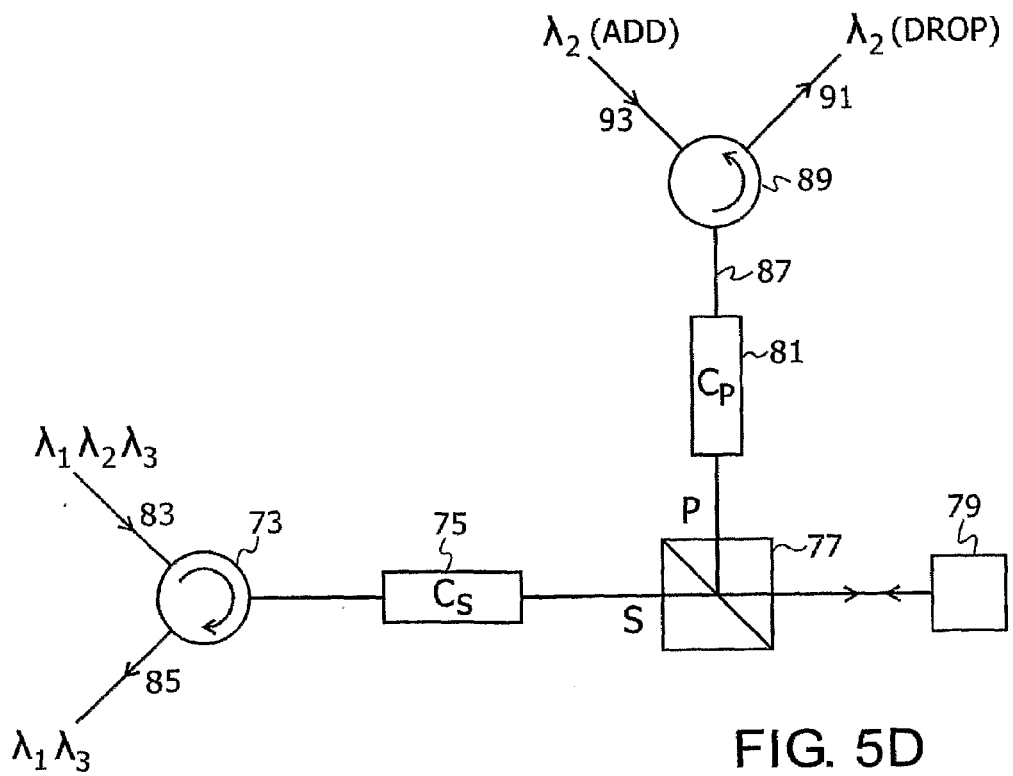
FIG. 5D is a schematic drawing of the input/output region of a 2×2 reflective wavelength selective switch, according to another preferred embodiment of the present invention, similar to the 1×2 switch shown in FIG. 5C, except that an additional circulator is added at the PBS output port of the switch of FIG. 5C.

Reference is now made to FIG. 5C, which is a schematic drawing of another preferred embodiment of the present invention, in which the addition of a PBS to the embodiment of FIG. 5A, or the addition of a circulator to the embodiment of FIG. 5B, enables a 1×2 wavelength selective switch to be implemented. Only the input/output region of the switch is shown in FIG. 5C, the rest of the switch being similar to that shown in FIG. 5A or 5B. In the embodiment of FIG. 5C, the input signal, comprising a range of wavelengths designated by $\lambda 1$, $\lambda 2$, $\lambda 3$, is applied to the input port 83 of the circulator 73. In order to simplify the explanation of this embodiment of the present invention, only three wavelengths are shown in FIGS. 5C and 5D. However, it is to be understood that the invention is equally operable with more wavelengths, as required by the application, and as allowed by the resolving power of the switch. The multiple wavelength input signal is passed via C-polarizer 75, which outputs S-polarization only, to a PBS 77 and into the switching section of the switch 79. If, taking as an example of the operation of the 1×2 switch, the $\lambda 2$ wavelength channel is activated, such that the polarization of the $\lambda 2$ light is rotated to P-polarization, the $\lambda 2$ signal is then reflected by the PBS 77, through a P-polarization C-polarizer 81 to the PBS output port 87, while the $\lambda 1$ and $\lambda 3$ signals pass through the PBS 77 and are output from the output port 85 of the circulator 73. If the $\lambda 2$ wavelength channel is not activated, then the $\lambda 2$ signal is also output from the output port 85 of the circulator 73. Any channel at the input port 83, can thus be switched to either of the 2 output ports 85, 87.

Reference is now made to FIG. 5D, which is a 2×2 wavelength selective switch, constructed and operative according to another preferred embodiment of the present invention. This switch is similar in construction to the 1×2 switch shown in FIG. 5C, except that an additional circulator 89 is added at the PBS output port 87. The other two ports of this circulator 89 are used as "add" 93 and "drop" 91 ports for whichever wavelength channel has been switched by the switch. For the example shown in FIG. 5D, this is the $\lambda 2$ wavelength channel. The output port 85 for the channels not added or dropped is known as the Express port.

Figure 5E:
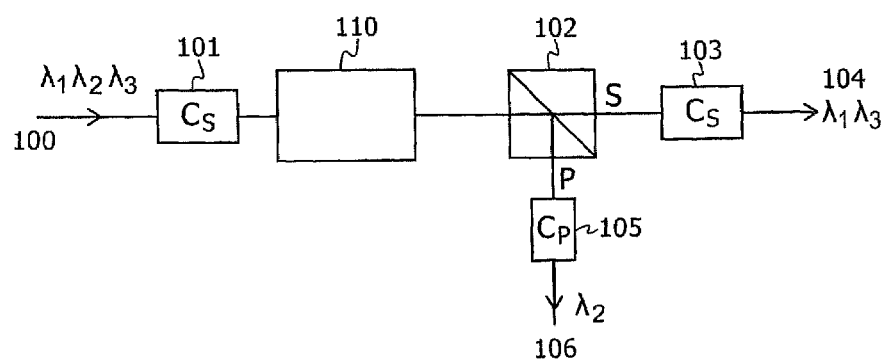
FIG. 5E is a schematic drawing of 1×2 wavelength selective switch, according to another preferred embodiments of the present invention, equivalent to the embodiment shown in FIG. 5C except that it is a transmissive rather than a reflective configuration.
Figure 5F:
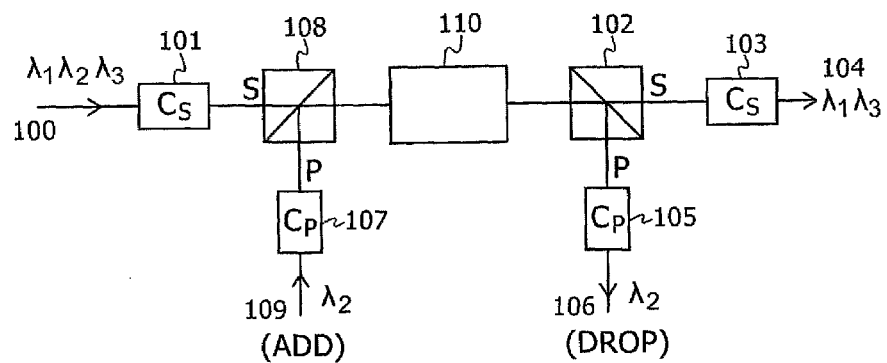
FIG. 5F is a schematic drawing of a 2×2 wavelength selective switch, constructed and operative according to another preferred embodiment of the present invention, similar in construction to the 1×2 switch shown in FIG. 5E, except that an additional PBS is added at the input to the transmissive switch.

According to further preferred embodiments of the present invention, one or more PBS's can also be added to the transmissive embodiments of the switches of the present invention, such as those shown in FIGS. 1A and 4E, to provide transmissive 1×2 or 2×2 wavelength selective switches, as will be illustrated in FIGS. 5E and 5F.

Reference is now made to FIG. 5E, which is 1×2 transmissive wavelength selective switch, constructed and operative according to another preferred embodiments of the present invention, and which is equivalent to the embodiment shown in FIG. 5C except that it is a transmissive rather than a reflective configuration. Only the input/output regions of the switch are shown in detail in FIG. 5E, the core of the transmissive switch, 110, being similar to the equivalent component arrangements shown in FIG. 1A or 4E. In the embodiment of FIG. 5E, the input signal, comprising a range of wavelengths designated preferably by $\lambda 1$, $\lambda 2$, $\lambda 3$, is applied to the input port 100 of the switch. The multiple wavelength input signal is passed via C-polarizer 101, which preferably outputs S-polarization only, into the switching section of the switch 110. The output from the switch 110 is directed to a PBS 102, where the S-polarization is directed out, through an S-polarization C-polarizer 103 to output port 104, and the P-polarization is reflected out through a P-polarization C-polarizer 105 to output port 106. If, taking as an example of the operation of the 1×2 switch, the $\lambda 2$ wavelength channel is activated, such that the polarization of the $\lambda 2$ light is rotated to P-polarization, the $\lambda 2$ signal is then reflected by the PBS 102, through the P-polarization C-polarizer 105 to the output port 106, while the $\lambda 1$ and $\lambda 3$ signals pass through the PBS 102 and are output from the output port 104. If the $\lambda 2$ wavelength channel is not activated, then the $\lambda 2$ signal is also output from the output port 104. Any channel at the input port 100, can thus be switched to either of the 2 output ports 104, 106.

Reference is now made to FIG. 5F, which is a 2×2 wavelength selective switch, constructed and operative according to another preferred embodiment of the present invention. This switch is similar in construction to the 1×2 switch shown in FIG. 5E, except that an additional PBS 108 is added at the input to the transmissive switch 110. The reflective port 109 of this PBS 108, with an intervening P-polarization C-polarizer 107, is used as an "add" port for whichever wavelength channel is to be added by the switch. For the example shown in FIG. 5F, this is the λ2 wavelength channel. The "drop" port is output port 106, as in the embodiment of FIG. 5E. The output port for the channels not dropped is known as the Express port 104.

As explained in relation to FIGS. 5C and 5D, only three wavelengths are shown also in FIGS. 5E and 5F. However, it is to be understood that these preferred embodiments of the invention are equally operable with more wavelengths, as required by the application, and as allowed by the resolving power of the switch.

Figure 5G:
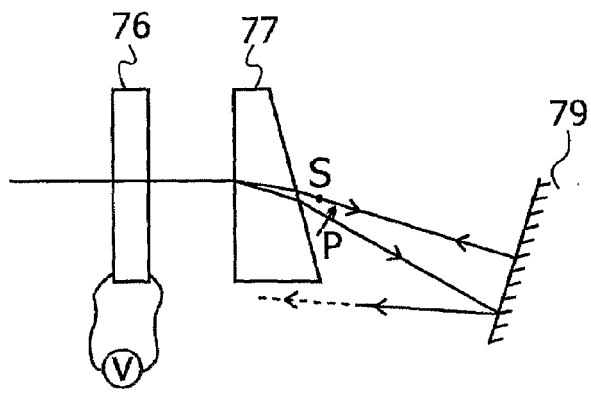
FIGS. 5G and 5H are schematic illustrations of more preferred arrangements for increasing the extinction ratio of reflective embodiments of the present invention, alternative to those shown in FIGS. 5A and 5B, using a birefringent wedge and a suitably aligned reflective mirror.
Figure 5H:
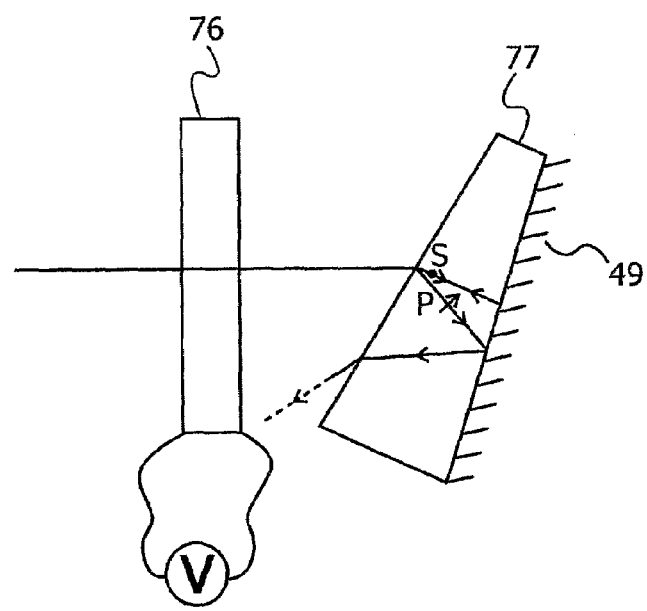

Reference is now made to FIGS. 5G and 5H, which are schematic illustrations of other preferred arrangements for increasing the extinction ratio of the reflective embodiments of the present invention, alternative to those shown in FIGS. 5A and 5B. Instead of the additional linear polarizer 78 used in FIGS. 5A and 5B, in the embodiments of FIGS. 5G and 5H, the beam traversing the polarization rotating element 76 is applied to a birefringent wedge 77, which angularly refracts the S- and the P-polarization components differently, thereby separating them. In the preferred embodiment of FIG. 5G, the reflective mirror 79 is a separate component and is disposed such that it is perpendicular to the S-polarization component, which is reflected back along its incident path, and retraverses the polarization rotation element 76. The P-polarized component, on the other hand, is reflected at an angle other than normal incidence, and thus gets lost in free space. In the preferred embodiment of FIG. 5H, the reflective mirror 49 is a reflective coating applied directly to the rear surface of the wedge 77, such that an additional separate reflection component is not required. Furthermore, using this embodiment, only one component needs to be aligned, therefore simplifying switch construction. The cell pixel direction in FIGS. 5G and 5H is perpendicular to the plane of the drawing. The use of such a birefringent wedge aligned so as to direct different polarization components of a beam incident thereon onto a reflective surface at different angles, can be utilized in any wavelength selective switch embodiment where two beams having the same polarization direction are passed through the operative sections of the switch. In general, this includes any switch embodiments in this application which utilize a C-polarizer for splitting the input beam into its two component beams, but also includes their use in those embodiments described in the above-mentioned co-pending PCT Application No. PCT IL02/00511.

Figure 6A:
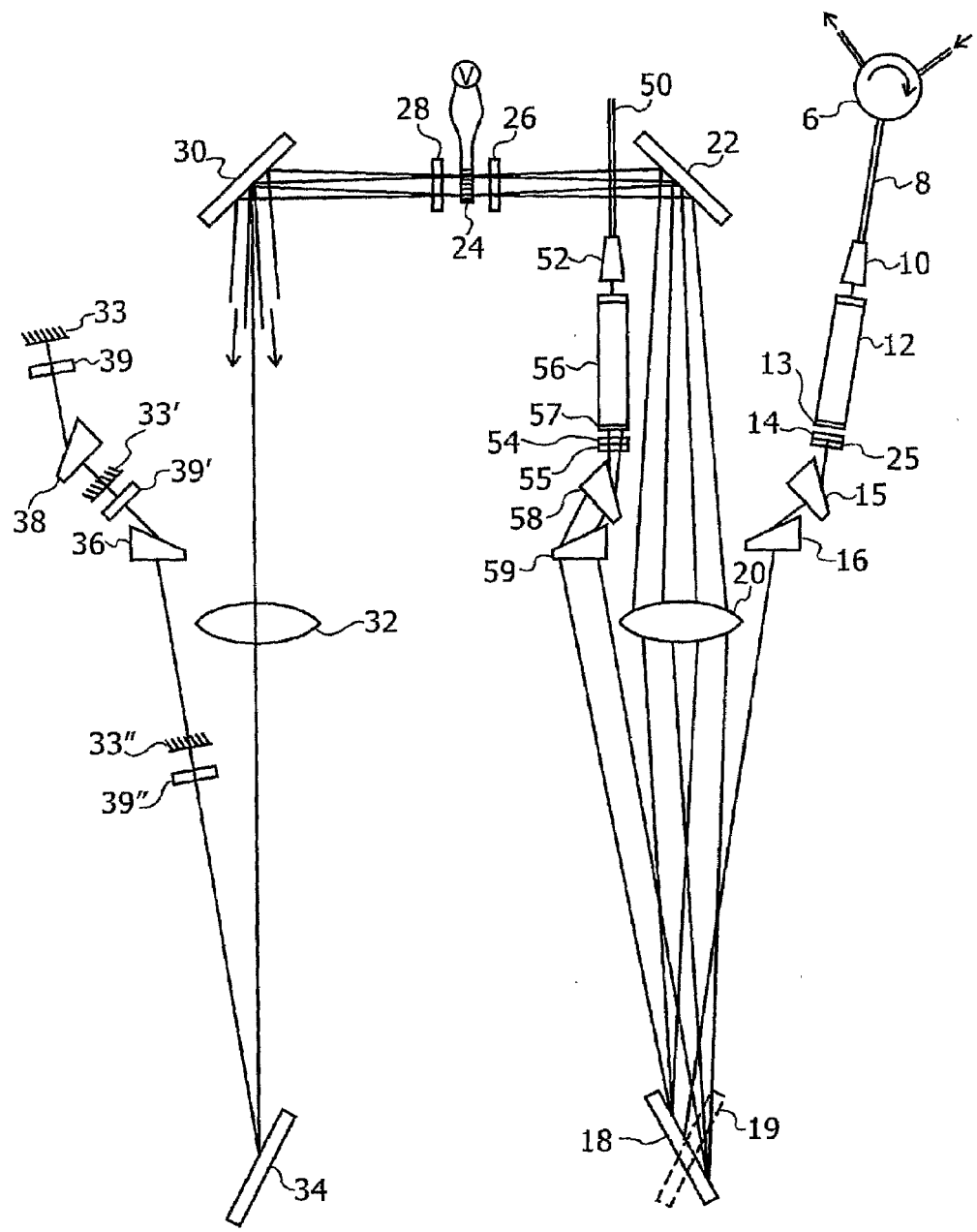
FIG. 6A is a schematic illustration of another preferred reflective embodiment of the wavelength selective switch of the present invention, in which a reflective element is disposed on the output side of the embodiment of FIG. 1A, at preferred locations after the output grating.
Figure 6B:
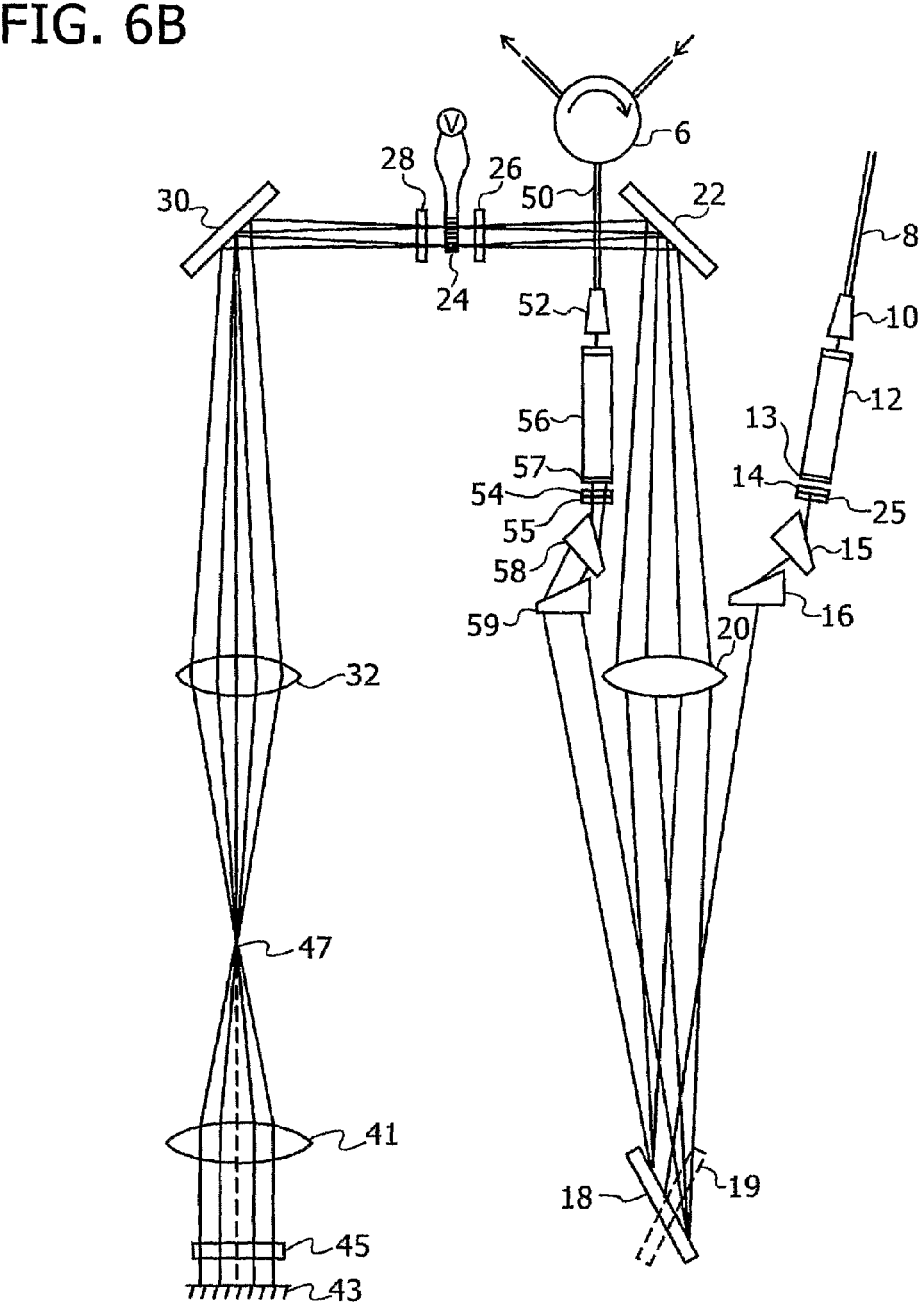
FIG. 6B is a schematic illustration of another preferred reflective embodiment of the wavelength selective switch of the present invention, similar to that shown in FIG. 6A except that the second grating is eliminated and a relay lens is used to generate a collimated beam for reflection from the reflective element back along the incident path onto the reflective element.

Reference is now made to FIGS. 6A and 6B, which show schematic illustrations of such a preferred embodiments, showing a number of alternative positions for the reflective element, all of these positions being after the output grating. In the embodiments of FIGS. 5A to 5D, and as specifically shown in FIGS. 5A and 5B, disposition of the linear polarizer between the polarization rotation element and the reflective element at the focal point of the lens may result in a degradation of the wavelength resolution, especially in configurations having a short focal length configuration. This arises since the beam spot is arranged to have its minimum size at the reflector surface, and as it distances itself from that surface, it diverges from its minimal size. If the polarization rotation element is not close to the mirror surface, such as is inevitable if a linear polarization element is inserted in between, the diverging beam may increase in size by the time it reaches the polarization rotation element to such an extent that the resolution of the switch is degraded, since the beam spot may cover more than a single pixel.

In contrast to the reflective embodiments of FIGS. 5A and 5B, in the embodiments of FIGS. 6A and 6B, the preferred location of the reflective element, together with its associated linear polarization element if provided, avoids this loss of resolution, by distancing the reflective element from the phase rotation element. This thereby endows the embodiments of FIGS. 6A and 6B with a significant advantage over those of FIGS. 5A and 5B, in that the beam can always be made to pass through the polarization rotation element in its most tightly focused configuration, such that the wavelength resolution of the switch can be at its optimum.

According to a first preferred embodiment of FIG. 6A, the reflective element 33 can be positioned at the end of the switch after the anamorphic prism pair 36, 38, or any other preferred beam expanding device used to collimate the "output" beams. A linear polarizing element 39, is preferably positioned in front of the reflective element 33, in order to increase the extinction ratio of the switch, as previously explained in connection with the embodiments of FIGS. 5A and 5B, or the reflective element may be comprised of a birefringent wedge and mirror as shown in the embodiment of FIG. 5G, this arrangement also having polarization selective properties. Alternatively and preferably, the reflective element, and its associated optional linear polarizing element, can be placed in positions 33' and 39' respectively, between the anamorphic prism pair 36, 38, or on either side of any other preferred beam spreading component used. According to another preferred embodiment, the reflective element, and its associated optional linear polarizing element, can be placed in positions 33" and 39" respectively, anywhere in the optical path downstream of the dispersion element 34. Since in any position downstream of the dispersion element 34, the beam is essentially collimated, and is non-dispersed, such that all of the wavelengths are handled in a similar manner, the exact position of the reflecting element is non-critical, thus simplifying construction and reducing costs of such embodiments, without compromising on switch blocking ratio or wavelength resolution. In FIG. 6A, it is to be understood that if the reflective element and its associated optional linear polarizing element is disposed in positions 33" and 39" respectively, the light beams do not proceed beyond 33", and the continuation beam shown in FIG. 6A is merely illustrative of the light path if the reflective surface is in either position 33' or 33. A similar understanding is applicable for the components in positions 33' and 39'.

A component such as a circulator, a PBS, a double collimator, or a dual collimator with a roof prism, must also be added at the input side of the embodiment of FIG. 6A, in order to separate the input from the switched or unswitched output beam. In the embodiment of FIG. 6A, this component is preferably shown as a circulator, 6, and is positioned at the outer alternative input fiber 8, though it is to be understood that if the inboard input fiber 50 is used, this beam separating component is positioned on the input fiber 50.

Reference is now made to FIG. 6B, which shows a schematic illustration of an alternative and preferred reflective embodiment to that shown in FIG. 6A, in which the light beams, after passage through the polarization rotation element 24, are transformed into collimated beams by means of an additional relay lens 41, disposed downstream of a complementary imaging lens 32. The focal cross-over 47 of the imaging lens 32 is preferably positioned to be at a distance 4 f from the input diffraction grating 18 or 19, in order to provide optimum optical transfer, as is known in the art. It is to be noted that in the schematic illustration of the embodiment in FIG. 6B, the focal cross-over 47 of the imaging lens 32, and the position of the relay lens 41 are not necessarily shown to the correct scale in relation to the imaging lens focal length, for reasons of convenience in displaying the entire switch optics on a single page.

A reflective element 43 and its optionally associated linear polarizing element 45, are disposed downstream of the relay lens 41, and because of the collimated nature of the beams incident on the reflective element 43, are returned along the same path, and back through the polarization rotation element and out of the switch via the input/output beam separation element 6, which, in this preferred embodiment, is shown on the inboard input fiber 50. Unlike the preferred embodiment of FIG. 6A, in the embodiment of FIG. 6B, the reflective element is operative on the wavelength dispersed beams, and no second dispersive element is used. This embodiment is therefore particularly simple, and provides the advantages of the double-pass reflective switch configuration with minimal component count.

It is also to be understood that a similar reflective embodiment to that shown in FIGS. 6A and 6B can also be constructed based on the transmissive embodiment of FIG. 4E.

In any of the reflective embodiments of FIGS. 5A to 6B, and in the reflective modifications which can be applied to the transmissive embodiment of FIG. 4E, the output beam travels back through the switch essentially along the same optical path as the input beam, and is separated therefrom by means of an additional component or components such as a circulator or a PBS. However, according to other preferred embodiments of the present invention, the output beams can be separated from the input beam in an alternative method, by means of spatial separation generated by the switch geometry. This is illustrated in the preferred embodiments shown in the following FIGS. 7 to 12C, wherein the input and output beams are spatially separated from each other by means of reflection from the mirror surface at an angle other than normal incidence, such that the input and output beam are handled along different paths, and with separate optical components, or with components large enough to cover, when appropriate, both input and output beams. In such embodiments, the need for a beam separating element such as a circulator or a PBS is obviated, thus saving construction costs and insertion loss.

Figure 7:
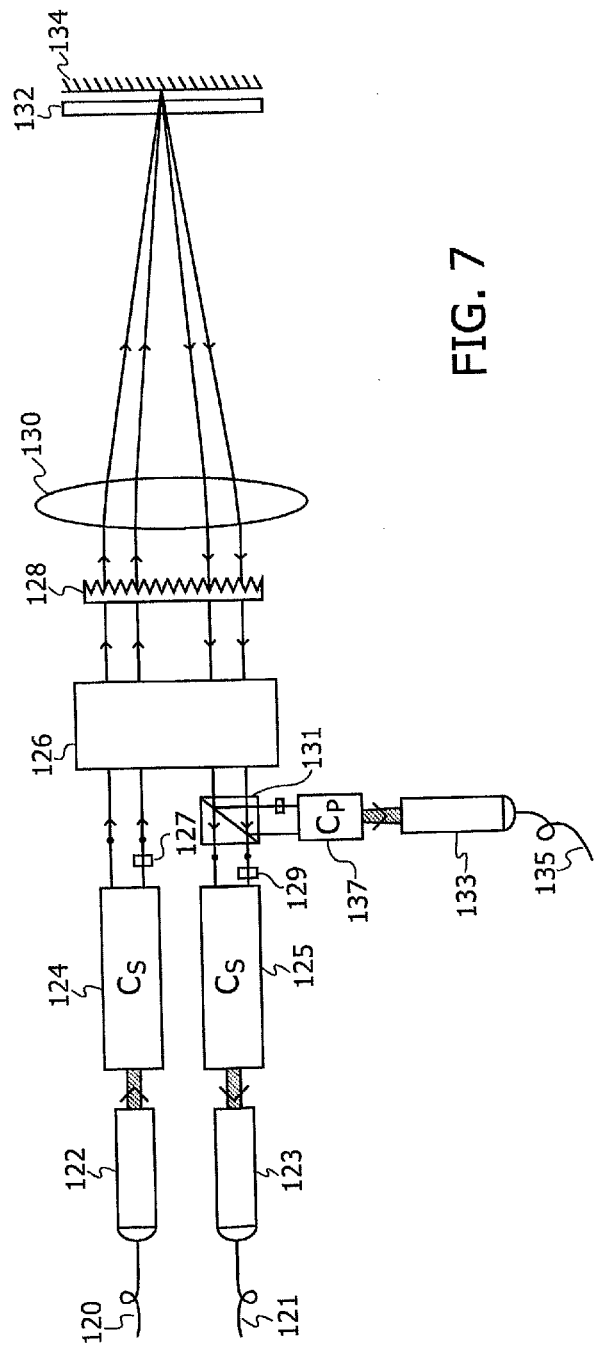

Reference is first made to FIG. 7, which is a schematic illustration of a multiple channel wavelength selective switch module, according to such a preferred embodiment of the present invention, in what is known as a two level configuration. It should be noted that this two-level configuration is achieved as a result of the angle of incidence of the reflection of the beams, while the two level configuration described in relation to the normal incidence embodiments of FIGS. 5A and 5B are achieved as a result of the direction in which the birefracted beam is diverted in the birefringent crystal. In the preferred embodiment of FIG. 7, the input signal 120 is applied to the input collimator 122, and from there to the input C-polarizer 124, which has a half wave plate 127 disposed on half of the crystal's output port, such that both input beams exiting the C-polarizer have the same S-polarization direction. The output from the C-polarizer 124 preferably passes through a directional beam expander 126, such as an anamorphic prism pair, where it is expanded in the direction perpendicular to the drawing plane. The expanded beams are also dispersed in the direction perpendicular to the plane of the drawing by means of the high efficiency grating 128, and focused by means of the lens 130 onto the pixelated polarization rotation device 132, preferably a pixelated liquid crystal cell, each dispersed wavelength range passing through its own associated pixel. The pixels are arranged in a direction perpendicular to the plane of the drawing. A reflective surface 134 disposed behind the polarization rotation device 132, or on its back surface, or on an inner surface of the LC cell adjacent to the ITO transparent electrode layer, returns the beam along a different path, according to the angle of incidence of the input beams, such that the output beams and input beams are spatially separated. The different wavelength components of the output beams, with their polarization rotated or not according to the settings of the applied control voltages to the various pixels 133 of the polarization rotation device 132, are recombined into a pair of laterally expanded beams in the grating 128, and recompressed to the original collimated beam sizes by means of the beam expander 126. The beam expander 126, the dispersive element 128, and the optical element 130 are shown in the preferred embodiment of FIG. 7, and in the embodiments of FIGS. 8 to 12C hereinbelow, as schematic single components which perform their respective functions both on the input beams to the polarization rotation element, and on the output beams reflected therefrom. Since the input and output beams are spatially close to each other, such use of these components is generally convenient, space saving and cost effective. However, it is to be understood that the embodiments shown in FIGS. 7 to 12C can equally be executed using any or all of separate beam expander, dispersive and focusing elements for the input and output beams, and such use is also intended to be included in the descriptions of these embodiments, and claimed as appropriate.

In a preferred embodiment of this switch without the presence of the PBS 131, a C-polarizer 125 having a half wave plate 129 disposed on half of the crystal's input port, receives this pair of collimated beams, outputting a single combined beam, and an output collimator 123 converts this beam into a single wavelength-switched output signal 121. In the preferred embodiments of FIG. 7, the diffraction grating is schematically shown as a transmission grating, though it is to be understood that a reflection grating, such as is shown in FIG. 1A may equally preferably be used. Furthermore, a linear polarizer can preferably and advantageously be added between the polarization rotation element 132 and the reflector 134, in a manner similar to that described in the reflective embodiments of FIGS. 5A and 5B.

A 1×2 switch can be implemented, as a modification to this embodiment, by inserting a polarization beam splitter 131 in the output path of the switch, before entry of the beams into the C-polarizer, Cs 125. Depending on the polarization direction of the output beam incident on the polarization beam splitter, which itself depends on the drive voltage applied to the relevant pixel of the polarization rotation device 132, the output is directed by the PBS 131 either through the C-polarizer Cp 137 to the output collimator 133 and its output fiber 135, or through the C-polarizer Cs 125 to the output collimator 123, and its output fiber 121.

Figure 8A:
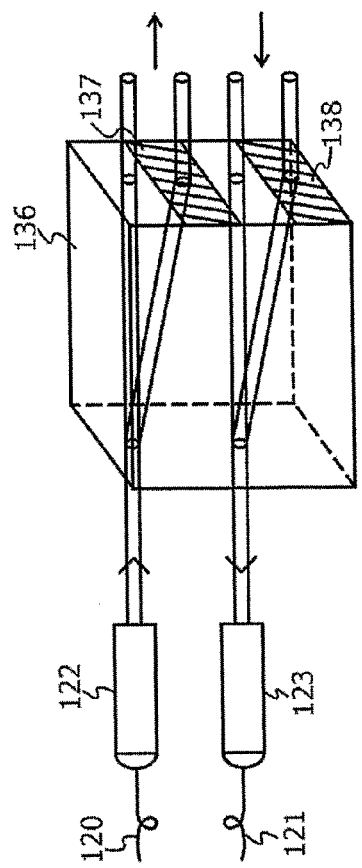
FIGS. 8A and 8B are schematic isometric views of preferred embodiments of the input and output collimators and the two C-polarizers of the two level switch of FIG. 7, enabling a particularly compact switch geometry.
Figure 8B:
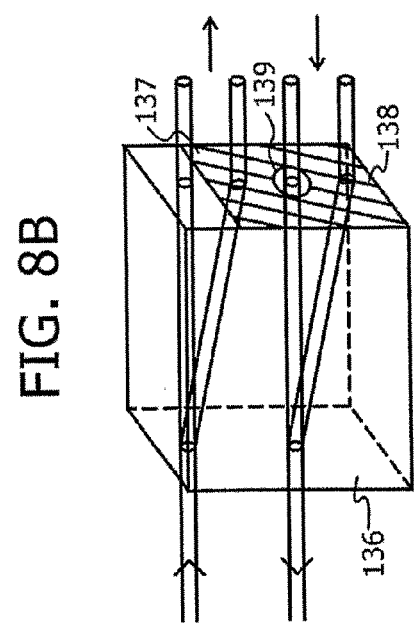

Reference is now made to FIG. 8A which shows a schematic isometric view of an alternative and preferred embodiment of the input and output collimators and the two C-polarizers of the two level switch of FIG. 7, in which the input and output polarization conversion functions are performed within a double C-polarizer comprising a single birefringent crystal 136, preferably of $YVO_4$. In this embodiment, the half-wave plates 137, 138, positioned over the extraordinary wave outputs of the C-polarizer ports, are shown. This embodiment provides for a particularly compact switch geometry, utilizing fewer components. The embodiment of FIG. 8A can be simplified even further if the embodiment shown in FIG. 8B is used, wherein the two half wave plates 137, 138 are replaced by a single wave plate 139, having an opening to allow the upper output beam to pass through unaffected. Such a single component, even with a hole formed therein, provides a cost advantage over the two half wave plates shown in FIG. 8A.

Use of a C-polarizer, whereby the entire cross section of the beam input to the grating and polarization rotator have the same polarization, makes this embodiment of the switch operate in what is known as a normally white configuration, if the polarization rotation device has zero birefringence when not activated. In such a configuration, without any switching voltage applied to the relevant pixel of the polarization rotation device 132, the light returns to the output port unblocked, and hence, the switch output is normally white. If the polarization rotation device has quarter wave birefringence when not activated, the switch then acts in a normally gray mode, all of these configurations being as described above in relation to FIGS. 4C and 4D.

Figure 9:
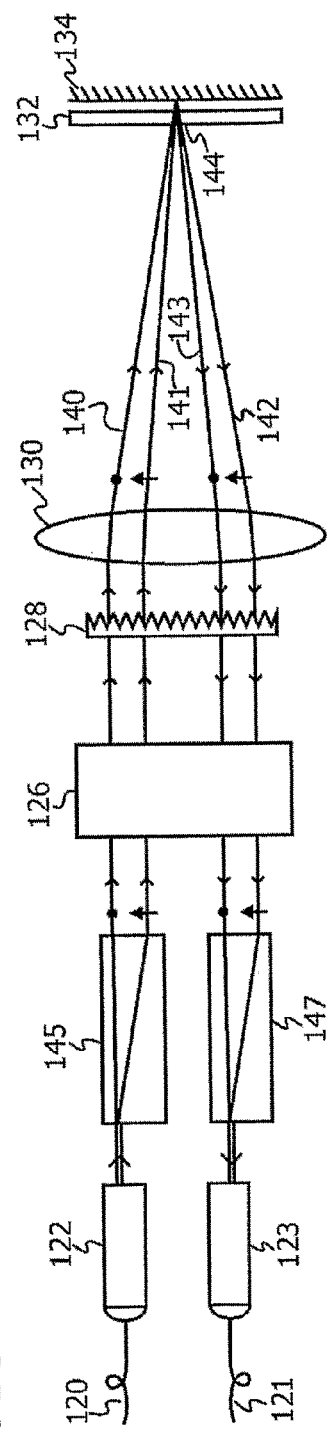

Reference is now made to FIG. 9, which is a schematic illustration of a reflective multiple channel wavelength selective switch module, according to yet another preferred embodiment of the present invention, similar to the two level embodiment shown in FIG. 7, but operating in a normally black switching configuration. This is achieved in this embodiment in that instead of the C-polarizers 124, 125 used in FIG. 7, the embodiment of FIG. 9 uses a pair of birefringent crystals, 145, 147, such as YVO$_4$, without half wave plates on part of the area of their output surfaces. Because of the geometric reversal of the positions of the P- and S-polarization beams, the switch is closed when the polarization rotation element is unactivated, such that the switch has a normally black configuration. In FIG. 9, the polarization rotation element for the particular wavelength path illustrated is shown activated, such that the switch is shown in the open configuration. Thus, the outer beam is input with S-polarization 140, and reflected as P-polarization 142, while the inner beam is input with P-polarization 141, and reflected as S-polarization 143. As described above in relation to FIGS. 4C and 4D, such an embodiment mandates the use of a low PDL grating 128. One advantage of the embodiment of FIG. 9 is that there is no wavelength dependence of the blocking. Alternatively and preferably to the use of individual input and output birefringent crystals, a single crystal can be used, as shown in FIGS. 10A and 10B below, provided that it has sufficient cross section to cover all of the beams.

Figure 10A:
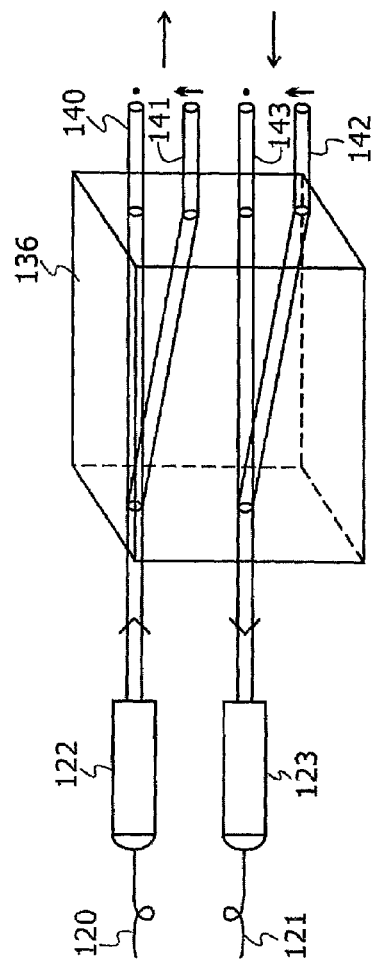
FIGS. 10A and 10B are schematic illustrations of the input and output collimators and the light passage through the polarization separating birefringent crystal of the two level embodiment of FIG. 9, where
Figure 10B:
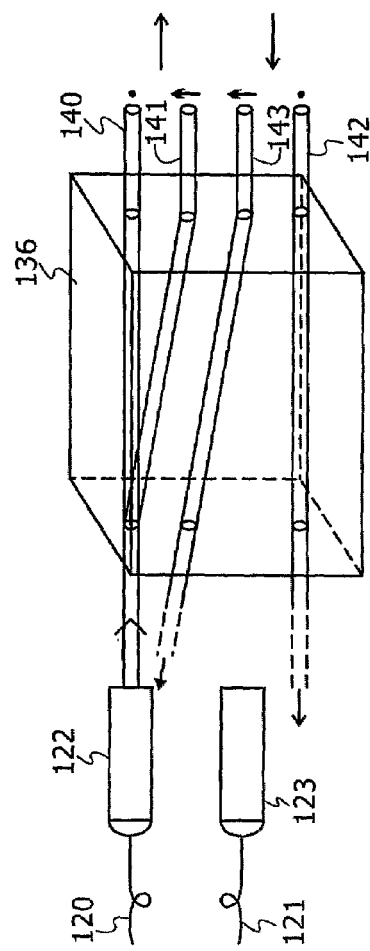

Reference is now made to FIGS. 10A and 10B, which are schematic illustrations of the input and output collimators 122, 123, and of the light passage through the polarization separating birefringent crystal 137 of an embodiment of the two level type of FIG. 9. FIGS. 10A and 10B illustrate the switching operation of this embodiment by showing the change in path of the switched and unswitched beams returning from the pixelated polarization rotation device 132, preferably a pixelated liquid crystal cell. Referring back to FIG. 9, it is important to note that because of the angle of incidence of the light on the polarization rotation device 132 and reflector 134, the outer beam of incoming light 140 returns from the switching elements as the outer beam of light 142, and vice versa for the inner incoming beam of light 141, which also returns as the inner beam 143. In the switch situation shown in FIG. 9, the pixel 144 on which the particular wavelength of the beam impinges, is activated to rotate the polarization direction of the light traversing, such that the S-polarized input beam 140 returns as a P-polarized beam 142, and the P-polarized input beam 141 returns as a S-polarized beam 143.

Referring now to FIG. 10A, which illustrates the same switch situation as is shown in FIG. 9, with the operative pixel 144 activated, the outer input beam 140 returns from the switching element as the outer output beam 142 with its polarization rotated to P-polarization, and is thus deflected in its passage back through the birefringent crystal 136, to be output by the output collimator 123. Similarly, the inner input beam 141 returns from the switching element as the inner output beam 143 with its polarization rotated to S-polarization, and is thus undeflected in its passage back through the birefringent crystal 136, to be output by the output collimator 123.

FIG. 10B now shows the opposite switch situation to that of FIGS. 9 and 10A, in which the pixel 144 is not activated, and for this normally black configuration, the birefringence is zero. In this case, the outer input beam 140 returns from the switching element as the outer output beam 142 but with its original polarization direction unchanged as S-polarization, and is thus not deflected in its passage back through the birefringent crystal 136. As a result, it is not coupled into the output collimator 123, and dissipates in free space. Likewise, the inner input beam 141 returns from the switching element as the inner output beam 143 also with its polarization direction unchanged as P-polarization, and is thus deflected in its passage back through the birefringent crystal 136. It is thus also not coupled into the output collimator 123. In this situation, the switch is thus in a blocking mode, and this switch is therefore known as having a normally black configuration.

Figure 11A:
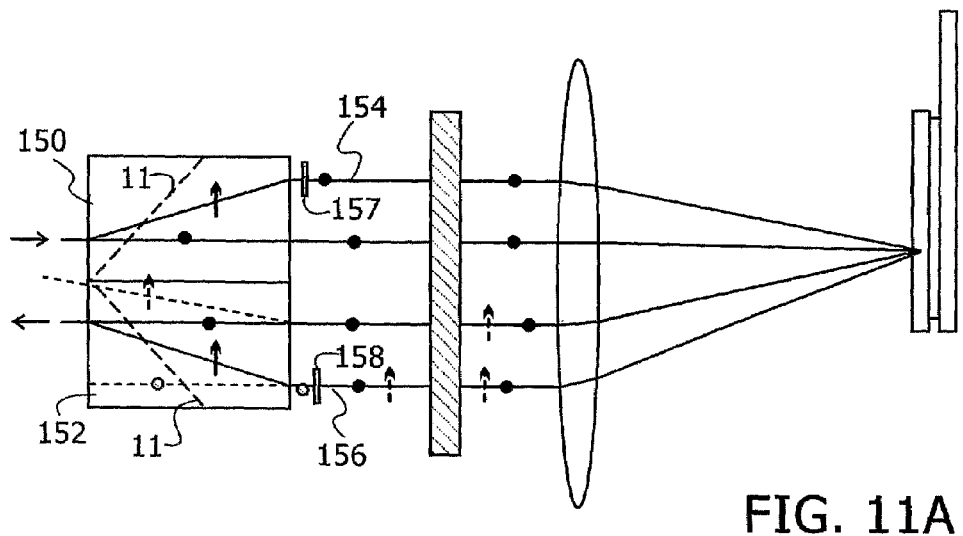
FIGS. 11A and 11B illustrate two alternative and preferable birefringent crystal alignment arrangements for use in two level embodiments such as shown in FIGS. 7 to 9.
Figure 11B:
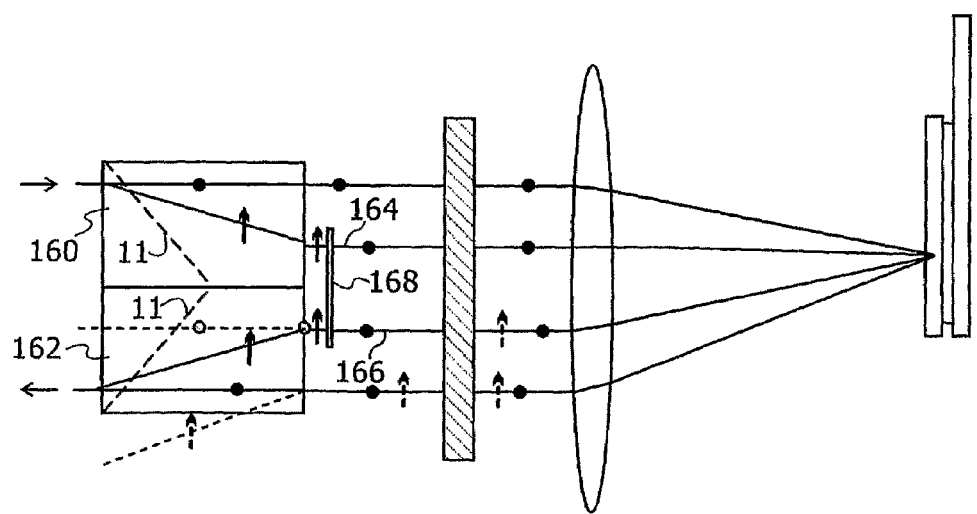

Reference is now made to FIGS. 11A and 11B, which illustrate two alternative and preferable C-polarizer construction arrangements for use in the two level embodiments of the present invention, as shown in FIGS. 7 and 8. In the embodiment shown in FIG. 11A, the orientations of the optical axes 11 of the two birefringent crystals 150, 152, are arranged in opposite directions, such that the birefracted beam on the input portion of the C-polarizer is deflected to the outside edge 154 of the crystal, and returns after switching to the opposite outer edge 156 of the crystal. In this configuration, two separate half-wave plates 157, 158 are required to rotate the polarization directions as required. In the preferred embodiment of FIG. 11B, on the other hand, the orientations of the optical axes of the birefringent crystals 160, 162, of the C-polarizers are arranged oppositely to those in the embodiments of FIG. 11A, such that the beams are birefracted inwards, with the result that both the birefracted input beam 164 outgoing to the switching elements, and its returning beam 166 from the switching element are disposed close together at the inner edge of the crystal. In this situation, it is possible to use a single half-wave plate 168, thereby engendering a saving in component costs. Furthermore, although the birefringent crystal in the embodiment of FIG. 11A is shown to be the same size as that of FIG. 11B, in practice, since it is difficult to physically position the input collimators as close as is indicated by the input and output beams of FIG. 11A, the embodiment of FIG. 11B generally enables use of a smaller birefringent crystal. Although the embodiments of FIGS. 11A and 11B show a C-polarizer, it is to be understood that the same advantages can be achieved also for birefringent crystals, such as YVO$_4$, without half wave plates on part of the area of their output surfaces, such as are used in the embodiment of FIG. 9.

In FIGS. 11A and 11B, the reflected output beams are shown as full circles (for S-polarization) and full arrows (for P-polarization) when the polarization rotation element has zero birefringence and has not rotated the polarization of the beams input thereto. On the other hand, they are shown as hollow circles (for S-polarization) and dotted arrows (for P-polarization) when the polarization rotation element has a total effect of half wavelength birefringence, and has rotated the polarization of the beams input thereto by 90°.

Figure 12A:
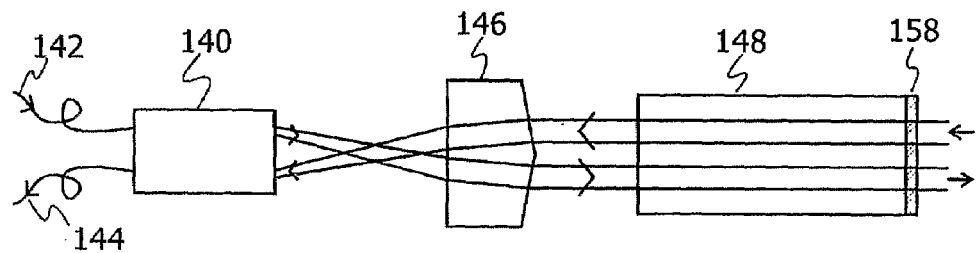
FIG. 12A is a schematic illustration of the front end of another preferred multiple channel, wavelength selective switch module viewed from the top of the switch, in which, like the embodiments of FIGS. 7 to 10B, the input and output beams are spatially separated by angular reflection from the reflective mirror, but unlike the embodiments of FIGS. 7 to 10B, a side-by-side configuration is used, in which the input and output beam paths are mutually disposed in the plane of the dispersion.

Reference is now made to FIG. 12A, which is a schematic illustration of the front end of a multiple channel, wavelength selective switch module, according to yet another preferred embodiment of the present invention, as viewed from the top of the switch. The embodiment of FIG. 12A is like those of FIGS. 7 to 10B in that the input and output beams shown are spatially separated by angular reflection from the reflective mirror. However, FIG. 12A differs from that of FIGS. 7 to 10B in that it illustrates a side-by-side configuration, in which the input and output beam paths are mutually disposed in the plane of the dispersion, as contrasted to the two level configurations of FIGS. 7 to 10B, where the input and output beam paths are mutually disposed in a direction perpendicular to the plane of the dispersion. An advantage of a side-by-side arrangement is that the packing density of the components in the switch module is higher, and if each switch is mounted in a single card, more cards can then be used per equipment rack. The embodiment of FIG. 12A also differs from those of FIGS. 7 to 10B in that it is shown with a dual collimator 140 implementation for inputting the optical input signal 142 and for outputting the output signal 144. The divergent beams exiting the dual collimator are rendered parallel preferably by means of a roof prism 146. The purpose of the roof prism and dual collimator is to position the two beams in a side by side configuration. Alternatively and preferably, a pair of wedge prisms can be used for this purpose, as is known in the art. This configuration can also be achieved in a number of alternative arrangements, such as using two separate collimators, as described in the previous embodiments of FIGS. 7 to 10B, two separate wedge prisms and a dual collimator, one collimator directed to the C-polarizer and a prism with an additional collimator, etc. For some of these arrangements, larger optical elements are required than for others. Furthermore, the previous two-level embodiments shown in FIGS. 7 to 10B can likewise use a roof prism, such as is illustrated in the preferred embodiment of FIG. 12A, or two separate wedge prisms and a dual collimator, one collimator directed to a C-polarizer and a prism with an additional collimator, etc.

If a roof prism 146 is used, the direction in which it faces is preferably chosen such that no beam is incident on a surface of the prism normally, such that back reflections are eliminated. In the embodiment shown in FIG. 12A, the input and output beams of the double collimator 140 pass through the plane floor surface of the prism at the left hand side (in the sense of FIG. 12A) of the prism, at an angle other than normal, and the parallel, or almost parallel beams directed towards the C-polarizer 148, pass through the angled roof of the prism, such that normal incidences are avoided both at entry and exit of the light beams from the prism.

From the roof prism, the input beam is preferably directed into a double C-polarizer 148, where it is split into two beams of perpendicular polarization, one situated beneath the other in FIG. 12A, which shows a view from the top of the switch. The diverted beam is situated directly below (or above) the undiverted beam, and hence is not visible separately in this plan view of the switch, but the comparative positions will be clearly shown in FIG. 12B below. A half wave plate 158 at the output of the diverted beam converts it to the same polarization as that of the undiverted beam. The input beams then pass through the beam expander to the dispersive element, which disperses the beams in the plane of the drawing, to the reflective switching element, and back over the output path, which is laterally displaced from the input path. The full beam paths are shown in FIG. 12C below.

Figure 12B:
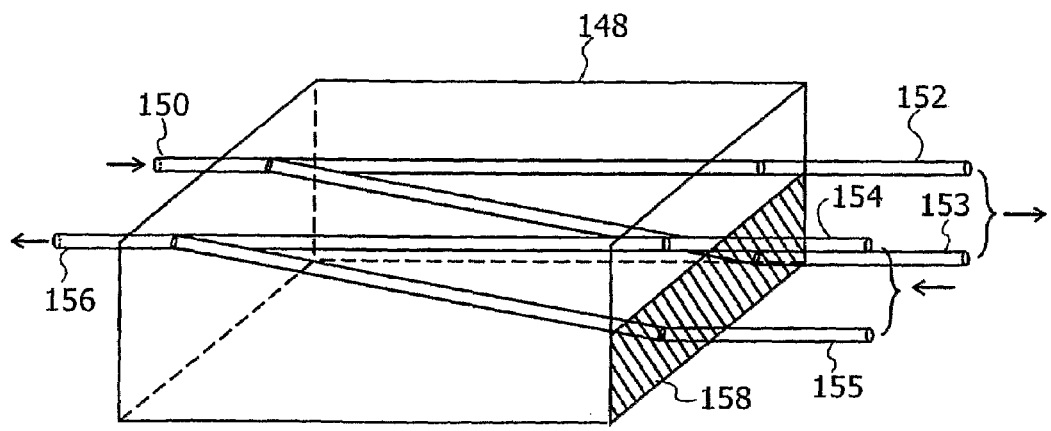
FIG. 12B is an isometric schematic illustration of the double C-polarizer of the side-by-side embodiment of FIG. 12A, showing the relative displacement of the input and output beams.

Reference is now made to FIG. 12B, which illustrates the displacement of the input and output beams by means of an isometric schematic illustration of the double C-polarizer 148. FIG. 12B shows the input beam 150, split into two parallel input beams 152, 153, proceeding with the same polarization direction towards the dispersion grating and the switching element, and the two output beams 154, 155, recombined into one output beam 156 after returning in a side-by-side configuration from the dispersion grating after processing by the polarization switching elements of the switch, and after reflection. The half wave plate 158 covers approximately half of the front output face of the C-polarizer. This preferred embodiment thus provides a particularly compact structure for the front end of the wavelength selective switch device. Alternatively and preferably, instead of the use of a C-polarizer, a birefringent crystal with low polarization dependent loss (PDL) gratings can be used, with corresponding changes in switch operation configuration, as explained in the embodiments of FIGS. 4D and 9.

Figure 12C:
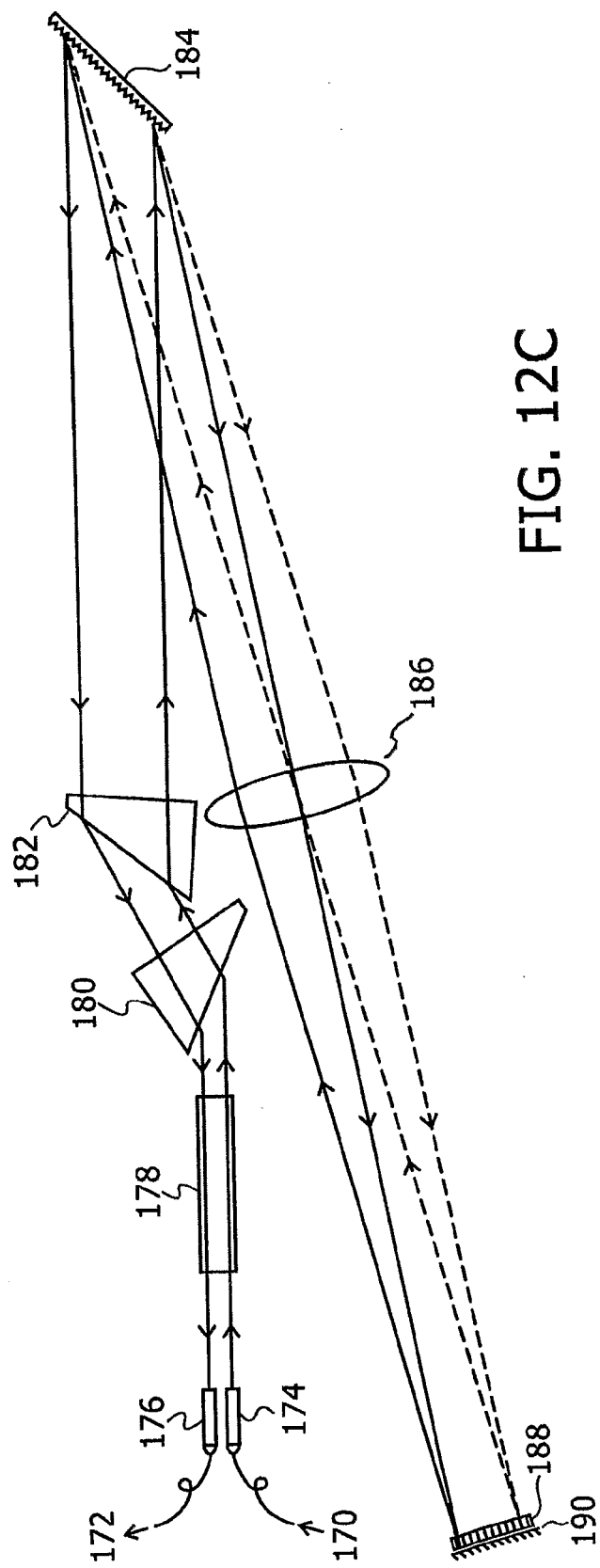

Reference is now made to FIG. 12C, which is a schematic view from the top of a preferred embodiment of a side-by-side switch, showing the complete optical configuration from input 170 to output 172. In this preferred embodiment, unlike that shown in FIG. 12A, a separate input collimator 174 and output collimator 176 are preferably used. The C-polarizer 178, separates the input beam preferably into two S-polarized components located one on top of the other in the direction perpendicular to the plane of the drawing, which are then spatially spread in the plane of the drawing preferably by an anamorphic prism pair 180, 182, and spectrally dispersed in the plane of the drawing by the high efficiency reflection grating 184. The spectral dispersion is illustrated in FIG. 12C by showing a beam of one dispersed wavelength as a full line, and a beam of another dispersed wavelength as a dashed line. The two dispersed wavelengths are illustrated to be at the extremities of the wavelength dispersion range. The spectrally dispersed beams are focused in this illustrated embodiment by a lens, 186, onto the pixelized polarization rotation element 188 and the reflective surface 190. Because of the angle of incidence of the incoming dispersed beams on the reflective surface, the reflected beams return through the switch back to the output collimator 176, displaced from the input beams in a side-by-side configuration, this providing a low profile switch, allowing a higher packing density of switches in an equipment rack.

As explained with respect to FIGS. 12A and 12B of this embodiment, instead of the use of a C-polarizer and a high efficiency grating configuration, a birefringent crystal with a low polarization dependent loss (PDL) grating can alternatively and preferably be used, with corresponding changes in switch operation configuration, as explained in the embodiments of FIGS. 4D and 9.

The wavelength selective switches in the above-described preferred embodiments of FIGS. 1A to 12C have all generally been described in terms of embodiments employing lateral beam expansion, since this provides optimum wavelength resolution, as explained hereinabove. However, it is to be understood that any of the described switch embodiments is also operable without the beam expansion components, for use in such applications where the resulting reduced resolution is acceptable.

Figure 12D:
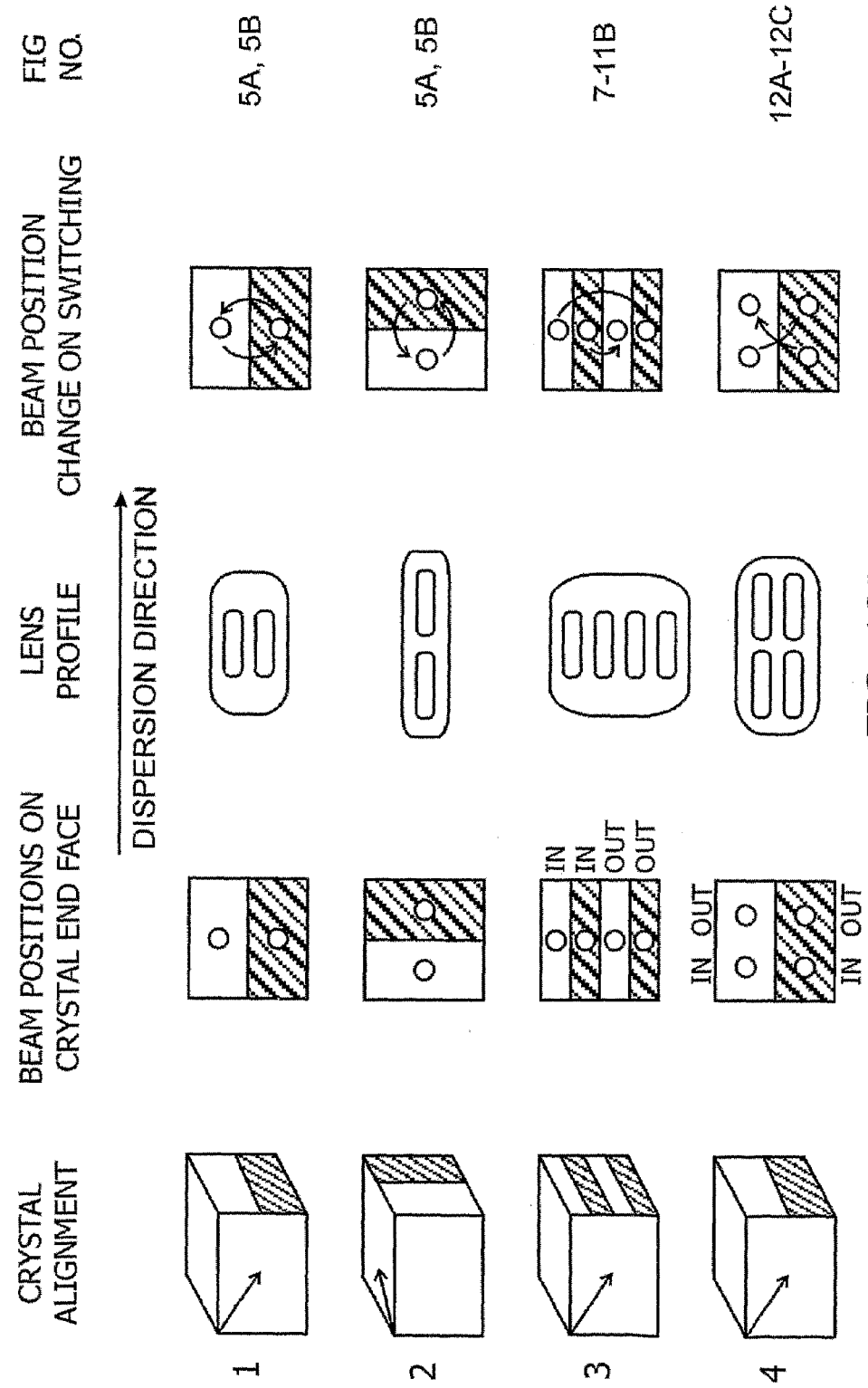
FIG. 12D illustrates schematically different switch geometries available from the various reflective switch embodiments described in FIGS. 5A to 12C.

Reference is now made to FIG. 12D which illustrates schematically different switch geometries available from the various reflective switch embodiments described in FIGS. 5A to 12C. As previously explained, the birefringent crystal, whether operative as a walk-off crystal without a half wave plate or as a C-polarizer, can have its optic axis aligned such that it directs the two beam components either laterally across the switch width, in the dispersion direction, or vertically, up or down the height of the switch, perpendicular to the dispersion direction, these two alternatives giving rise respectively to side-by-side or two-level configurations. Furthermore, in configurations using separate input and output collimators, and relying on the angle of incidence of the beams on the reflective surface to separate the input from the output beams, the focusing of the beams by the lens and their reflection generates a reversal of position of the component beams, and this too is dependent on the mutual position of the component beams relative to the direction of reflection, i.e. whether the reflection is made in the plane of dispersion or perpendicular thereto. These combinations result in a number of different combinations, which require different sized optical components, and result in different shaped switch profiles, each having its own advantages and disadvantages. The most important of these configurations are summarized in FIG. 12D.

FIG. 12D is in the form of a graphic table, each row showing a different preferred switch configuration. The columns show:
(a) a diagram showing the alignment of the optical axis of the birefringent crystal;
(b) a diagram of the beam positions on the crystal end face, with the position of half wave plates used;
(c) a cross section of the focusing lens profile, showing the beams after lateral expansion;
(d) a diagram of the crystal end face showing how beams of predetermined polarization interchange position after reflection and passage through the optical system; and
(e) a list of the drawings in this application which relate to each configuration.

The rows of FIG. 12D show:
1. Reflective configurations using a single collimator for input and output, with normal incidence reflection. The birefringent optic axis is such as to generate a two-level pair of beam polarization components, which exchange position vertically after reflection and passage through the optical system because of the cross-over of the two beams through the focus of the lens. A circulator or polarized beam splitter is used to separate input from output.
2. Reflective configurations using a single collimator for input and output, with normal incidence reflection. The birefringent optic axis is such as to generate a side-by-side pair of beam polarization components, which exchange position horizontally after reflection and passage through the optical system. This configuration is of lower height than that of row 1, which is advantageous in stacked switch configurations, but a larger focusing lens is required. A circulator or polarized beam splitter is used to separate input from output.
3. Reflective configurations using separate input and output collimators, and in which the input and output beams are separated geometrically by the angle of incidence effect at the reflective surface generated by the radial position of the beam in the focusing lens. The birefringent optic axis is such as to generate a two-level pair of beam polarization components, which, after reflection and passage through the optical system, change position vertically. In addition, the diverting of the input beams in a direction perpendicular to the dispersion direction causes the output beams to exchange position vertically relative to their corresponding input beams because of reflection and passage through the optical system. As a result, the switching of a particular beam component results in a vertical interchange of beam position at the output. Without detracting from the generality of the content of FIG. 12D, it is noted that in addition to the preferred embodiment shown in the first column of row 3, there are other preferred positions for the half wave plates, as shown in the various embodiments of FIGS. 7 to 11B. Furthermore, the single birefringent crystal can be replaced by a pair of crystals, as shown in FIGS. 11A and 11B.
4. Reflective configurations using separate input and output collimators, and in which the input and output beams are separated geometrically by the angle of incidence effect at the reflective surface generated by the radial position of the beam in the focusing lens. The birefringent optic axis is such as to generate a two-level pair of beam polarization components, which, after reflection and passage through the optical system, change position vertically. However, unlike the embodiments of row 3, the diverting of the input beam components in a direction parallel to the dispersion direction results in a side-by-side geometrical arrangement of input and output beams after reflection, such that the output beam of a specific polarization changes position horizontally relative to its corresponding input beam. As a result, the switching of a particular beam component results in a crossed interchange of position at the output. This configuration also requires a larger lens, though the side-by-side input-output geometry enables a lower profile switch unit to be achieved.

It is to be understood that although FIG. 12D shows half wave plates in all of the illustrations, implying C-polarizer applications, the same geometric considerations are applicable for walk-off birefringent crystal configurations. In the embodiments shown, for C-polarizer configurations, a high efficiency grating can be used, while for walk-off birefringent crystal configurations, a low polarization dependent loss (lpdl) grating has to be used.

Figure 13:
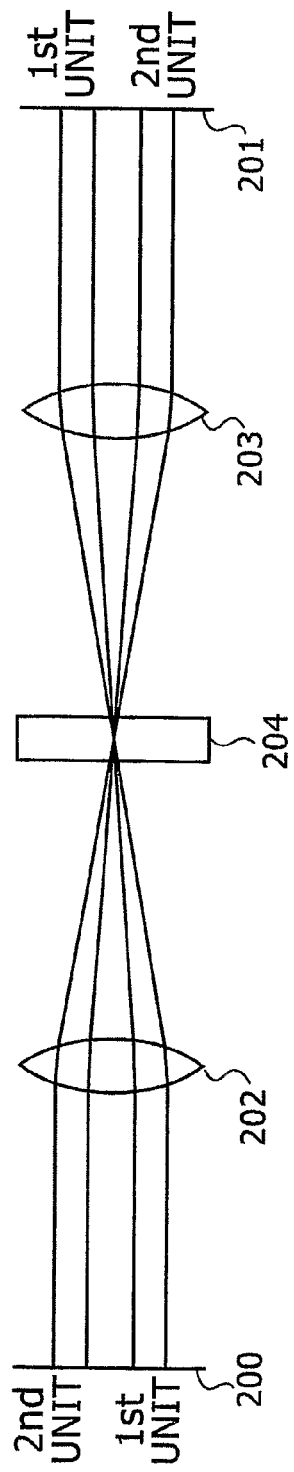
FIG. 13 is a schematic illustration of a multiple channel wavelength selective switch module, according to yet another preferred embodiment of the present invention, comprising a pair of 1×1 switches stacked one on top of the other in a single package, and utilizing common gratings, lenses and liquid crystal cells.

Reference is now made to FIG. 13 which is a schematic illustration of a multiple channel wavelength selective switch module, according to yet another preferred embodiment of the present invention. The embodiment is similar to that whose optically active section is shown schematically in FIG. 2A, except that in the embodiment of FIG. 13, a pair of separate 1×1 switches are stacked one on top of the other in the same package, and preferably utilize common dispersive elements 200, 201, common focusing lenses, 202, 203, and a common liquid crystal cell 204. In addition, although not shown in FIG. 13, the prism pair and C-polarizer can be common as well, but separate collimators are of course required for input and output. Application of the appropriate control voltage to the liquid crystal cell switches both channels simultaneously, thus providing switching redundancy. By sharing of these common components, such an embodiment enables a compact and component economical device to be constructed in a single package.

Figure 14:
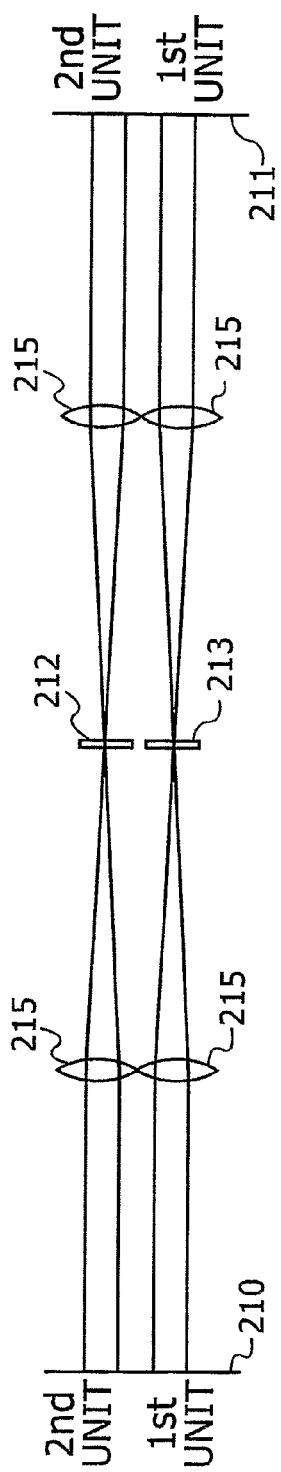
FIG. 14 is a schematic illustration of another multiple channel wavelength selective switch module, similar to that of FIG. 13, but utilizing only common gratings.

Reference is now made to FIG. 14 which is a schematic illustration of a multiple channel wavelength selective switch module, according to yet another preferred embodiment of the present invention. This embodiment differs from that of FIG. 13 in that only the dispersion gratings 210, 211, are common to the two channels transmitted through the switch, while the liquid crystal cells 212, 213, and their associated focusing lenses 215 are independent. By this means, any channel in either switch can be blocked independently. By sharing of some common components, such an embodiment enables a more compact and component economical multi-channel device to be constructed in a single package.

Though the multiple unit embodiments shown in FIGS. 13 and 14 are shown as transmissive switch embodiments, it is to be understood that the same package sharing techniques can also be applied to the reflective embodiments shown in FIGS. 5A and 5C. Likewise, although only a pair of switches are shown in each of the modules of FIGS. 13 and 14, it is to be understood that the same package sharing techniques can also be applied for more than two switches in each module. Further examples of such switch stacking techniques, to provide multiply parallel, wavelength selective switches, useful for providing switching or blocking capability with channel redundancy, as is known in the art, are described in the above-mentioned PCT Application, No. PCT IL02/00511, hereby incorporated by reference in its entirety.

Figure 15:
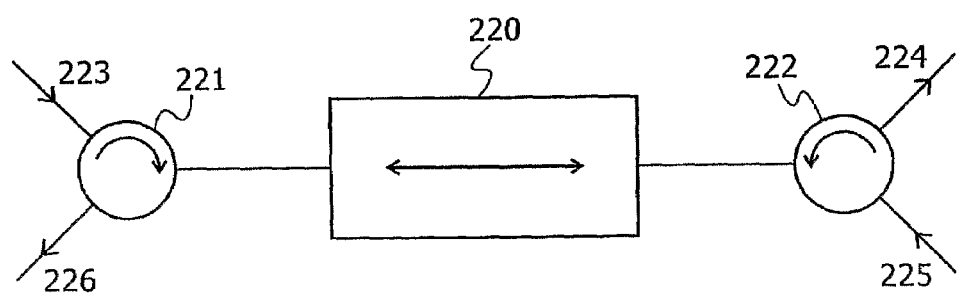
FIG. 15 illustrates schematically an optical system including a transmissive bi-directional optical module, showing utilization of the bi-directional properties of light propagation, to ensure maximum utilization of optical system modules.

Reference is now made to FIG. 15, which illustrates schematically an optical system including a transmissive bi-directional optical module 220, constructed and operative according to a preferred embodiment of the present invention. The preferred embodiment of FIG. 5G provides a new method of utilizing the bi-directional properties of light propagation, to ensure maximum utilization of optical system modules. Though the embodiment of FIG. 5G is shown using a transmissive wavelength selective switch 220, it is to be understood that this aspect of the present invention is also executable using any bi-directional transmissive optical module, where the module processes the optical signal transmitted therethrough according to its predetermined function. According to a preferred embodiment of the present invention, the input and output ports of the optical module are equipped with directionally dependent components such as circulators such that the light entering or leaving that port can be separated into different pathways. In this way, each bi-directional port is effectively converted by the circulator into two unidirectional ports, in which input and output signals are separated, such that a single module can be used in two separate circuits.

In FIG. 15 is shown a transmissive wavelength selective switch 220 with three-port circulators 221, 222 at its input and output ports. Since the transmissive wavelength selective switch 220 is a bi-directional device, the terms input and output are nominal and are defined only relative to the particular direction of use at the time considered. An input signal arriving at port 223 of circulator 221 is input to the switch 220, where it undergoes the wavelength dependent switching programmed for the signal, and is output to circulator 222, from which it exits by port 224. An input signal arriving at port 225 of circulator 222 is input into the module 220, where, on condition that the module is bi-directional, it undergoes the optical signal processing characteristic of that module, and is output to circulator 221, from which it exits by port 226. The system can thus be used by traffic flowing in both directions through separate circuits, and since it comprises only a single module 220, a saving in component requirements is thus achieved.

The optical module 220, can preferably be a wavelength selective switch, a dynamic gain equalizer, a filter, a channel blocker, or any other optical signal processing module, on condition that it is truly bi-directional. It is understood that if the module is a multi-channel processor, then the channel processing selection criteria will be the same for the two directions of propagation, since the selection criteria are applied independently of the propagation direction, in keeping with the bi-directionality of the module.

It is to be understood that the various switch embodiments shown hereinabove, whether transmissive or reflective, can also be operative as a wavelength selective attenuator, by use of the appropriate drive voltages to the pixels of the liquid crystal element, or can be operative using circularly polarized light instead of linearly polarized light.

It is appreciated by persons skilled in the art that the present invention is not limited by what has been particularly shown and described hereinabove. Rather the scope of the present invention includes both combinations and sub combinations of various features described hereinabove as well as variations and modifications thereto which would occur to a person of skill in the art upon reading the above description and which are not in the prior art.

We claim:

1. A wavelength selective optical switch comprising:
    a first birefringent element for receiving input light having a plurality of wavelength components, said element adapted to decompose said input light into two light beams having different polarizations;
    a beam expanding device for expanding said two light beams having different polarizations in a predetermined plane;
    a first dispersive element receiving said expanded two light beams having different polarizations, and dispersing different wavelength components of said expanded light beams in said predetermined plane;
    at least one optical element for focusing said dispersed wavelength components of said expanded light beams of different polarizations onto a focal plane;
    a polarization rotation element located essentially at said focal plane, said polarization rotation element being pixelated generally along the direction of said dispersion such that separate pixels are associated with separate wavelength components of said expanded light, at least one pixel of said polarization rotation element being operative to rotate the polarization of light passing through said pixel according to a control signal applied to said pixel;
    at least one optical element for collecting said dispersed wavelength components of said expanded light beams after passing though said polarization rotation element, to regenerate two output expanded light beams;
    a second dispersive element receiving said two output expanded light beams and operative to combine them into two multi-wavelength output light beams;
    a beam compressing device aligned such that said two multi-wavelength output light beams are compressed in said predetermined plane; and
    a second birefringent element for combining only those wavelength components of said two multi-wavelength output light beams having predetermined different polarizations into one transmitted output beam.

2. A wavelength selective optical switch according to claim 1, wherein the transmission of said light in said output beam having a wavelength component associated with said at least one pixel, is determined by said control signal.

3. A wavelength selective optical switch according to claim 1, and wherein at least one of said first and second dispersive elements is a grating having low polarization dependent loss.

4. A wavelength selective optical switch according to any of the previous claim 1 and wherein said at least one optical element for focusing said dispersed wavelength components of said expanded light beams of different polarizations onto a focal plane is said first dispersive element itself.

5. A wavelength selective optical switch according to claim 1 and wherein said control signal applied to said pixel is such as to rotate the direction of the polarization of light passing through said pixel through essentially 90°.

6. A wavelength selective optical switch according to claim 1 and wherein at least one of said beam expanding device and said beam compressing device is any one of a pair of anamorphic prisms, a single prism, and a cylindrical lens telescope system.

7. A wavelength selective optical switch according to claim 6, wherein at least one surface of at least one of said prisms has a low polarization dependent loss anti-reflection coating.

8. A wavelength selective optical switch according to claim 1 and wherein said polarization rotation element is a liquid crystal cell.

9. A wavelength selective switch module comprising a plurality of wavelength selective switches according to claim 1, and wherein at least two of said wavelength dependent switches utilize a common one of at least one of a dispersive element, a focusing element and a polarization rotation element.

10. A wavelength selective optical switch comprising:
a first birefringent element for receiving input light having a plurality of wavelength components, said element adapted to decompose said input light into two light beams having essentially the same predetermined polarization direction;
a beam expanding device for expanding said two light beams in a predetermined plane;
a first dispersive element receiving said expanded two light beams, and dispersing different wavelength components of said expanded light beams in said predetermined plane;
a first at least one optical element for focusing said dispersed wavelength components of said expanded light beams onto a focal plane;
a polarization rotation element located essentially at said focal plane, said polarization rotation element being pixelated generally along the direction of said dispersion such that separate pixels are associated with separate wavelength components of said expanded light, at least one pixel of said polarization rotation element being operative to rotate the polarization of light passing through said pixel according to a control signal applied to said pixel;
a second at least one optical element for collecting said dispersed wavelength components of said expanded light beams after passing through said polarization rotation element, to regenerate two output expanded light beams;
a second dispersive element receiving said two output expanded light beams and operative to combine them into two multi-wavelength output light beams; and
a reflective element disposed downstream of said second dispersive element operative to reflect said output light beams back through said switch along their input path but in a reverse direction, and wherein only those wavelength components of light reflected back through said at least one pixel having said predetermined polarization direction are recombined by said first birefringent element for transmission back out of said switch.

11. A wavelength selective optical switch according to claim 10 and also comprising a beam compressing device disposed after said second dispersive element and wherein said reflective element is disposed after said beam compressing device.

12. A wavelength selective optical switch according to claim 10 and wherein said beam compressing device comprises a plurality of components, and said reflective element is disposed between said components.

13. A wavelength selective optical switch according to claim 10, and also comprising a linear polarizing element disposed in front of said reflective element.

14. A wavelength selective optical switch according to claim 10 and wherein said input light is received from an input fiber, and said light directed back through said switch is directed into an output fiber, and wherein said switch also comprises a beam separating element to separate light in said output fiber from light in said input fiber.

15. A wavelength selective optical switch according to claim 14 and wherein said beam separating device is a circulator.

16. A wavelength selective optical switch comprising:
a birefringent element for receiving input light having a plurality of wavelength components, said element adapted to decompose said input light into two light beams having essentially the same predetermined polarization direction;
a beam expanding device for expanding said two light beams in a predetermined plane;
a dispersive element receiving said expanded two light beams, and dispersing different wavelength components of said expanded light beams in said predetermined plane;
a first at least one optical element for focusing said dispersed wavelength components of said expanded light beams onto a focal plane;
a polarization rotation element located essentially at said focal plane, said polarization rotation element being pixelated generally along the direction of said dispersion such that separate pixels are associated with separate wavelength components of said expanded light beams, at least one pixel of said polarization rotation element being operative to rotate the polarization of light passing through said pixel according to a control signal applied to said pixel;
a second at least one optical element for collecting said dispersed wavelength components of said expanded light beams after passing through said polarization rotation element, to regenerate two output expanded light beams;
a third at least one optical element for collimating said regenerated two output expanded light beams; and
a reflective element disposed in said collimated regenerated two output expanded light beams, and operative to reflect said output light beams back through said switch essentially along their input path but in a reverse direction, and wherein only those wavelength components of said light reflected back through said at least one pixel having said predetermined polarization direction are recombined by said birefringent element for transmission back out of said switch.

17. A wavelength selective optical switch according to claim 16, and also comprising a linear polarizing element disposed in front of said reflective element.

18. A wavelength selective optical switch according to claim 16 and wherein said input light is received from an input fiber, and said light directed back through said switch is directed into an output fiber, and wherein said switch also comprises a beam separating element to separate light in said output fiber from light in said input fiber.

19. A wavelength selective optical switch according to claim 18 and wherein said beam separating device is a circulator.

20. A wavelength selective optical switch comprising:
a birefringent element for receiving input light having a plurality of wavelength components, said element adapted to decompose said input light into two light beams having different polarizations;
a beam expanding device for expanding said two light beams having different polarizations in a predetermined plane;
a dispersive element receiving said expanded two light beams having different polarizations, and dispersing different wavelength components of said expanded two light beams in said predetermined plane;

at least one optical element for focusing said dispersed wavelength components of said expanded two light beams of different polarizations onto a focal plane;

a polarization rotation element located essentially at said focal plane, said polarization rotation element being pixelated generally along the direction of said dispersion such that separate pixels are associated with separate wavelength components of said two light beams, at least one pixel of said polarization rotation element being operative to rotate the polarization of light passing through said pixel according to a control signal applied thereto; and a reflective surface disposed in proximity to and after said polarization rotation element, such that said wavelength components of said two light beams passing through said at least one pixel of said polarization rotation element are reflected back through said at least one pixel.

21. A wavelength selective optical switch according to claim 20, wherein said wavelength components of said two light beams reflected back through said at least one pixel are directed back through said switch essentially along their input path but in a reverse direction, through said at least one optical element, said dispersive element, said beam expanding device, and said birefringent element, and wherein only those wavelength components of said light reflected back through said at least one pixel having predetermined different polarizations are recombined by said birefringent element for transmission back out of said switch.

22. A wavelength selective optical switch according to claim 21, wherein said transmission back out of said switch of said light having a wavelength component associated with said at least one pixel, is determined by said control signal.

23. A wavelength selective optical switch according to claim 20 and wherein said control signal applied to said at least one pixel is such as to rotate the direction of the polarization of light passing through said pixel through essentially 45°.

24. A wavelength selective optical switch according to claim 21 and wherein said input light is received from an input fiber, and said light directed back through said switch is directed into an output fiber, and wherein said switch also comprises a beam separating device to separate light in said output fiber from light in said input fiber.

25. A wavelength selective optical switch according to claim 24 and wherein said beam separating device is a circulator.

26. A wavelength selective optical switch according to claim 20 and wherein said beam expanding device is any one of a pair of anamorphic prisms, a single prism, and a cylindrical lens telescope system.

27. A wavelength selective optical switch according to claim 26, wherein at least one surface of at least one of said prisms has a low polarization dependent loss anti-reflection coating.

28. A wavelength selective optical switch according to claim 20 and wherein said polarization rotation element is a liquid crystal cell.

29. A wavelength selective optical switch comprising:

a birefringent element for receiving input light having a plurality of wavelength components from a first input port, said element adapted to decompose said input light into two light beams having the same predetermined polarization;

a polarized beam splitting device receiving said two light beams having the same predetermined polarization;

a beam expanding device for expanding in a predetermined plane, said two light beams after transmission through said polarized beam splitter;

a dispersive element receiving said expanded two light beams, and dispersing different wavelength components of said expanded two light beams in said predetermined plane;

at least one optical element for focusing said dispersed wavelength components of said expanded two light beams onto a focal plane;

a polarization rotation element located essentially at said focal plane, said polarization rotation element being pixelated generally along the direction of said dispersion such that separate pixels are associated with separate wavelength components of said two light beams, at least one pixel of said polarization rotation element being operative to rotate the polarization of light passing through said pixel according to a control signal applied thereto;

a reflective surface disposed in proximity to and after said polarization rotation element, such that wavelength components of said two light beams passing through said at least one pixel of said polarization rotation element are reflected back through said at least one pixel; and and a second birefringent element disposed at a reflective output of said polarized beam splitter, for receiving two light beams reflected in said polarized beam splitter and having like but orthogonal polarization to said predetermined polarization, said second birefringent element being adapted to recompose said two light beams into an output light beam, such that those wavelength components of said two light beams reflected back through said polarization rotation element having their polarization direction rotated by said at least one pixel are output from said switch at a first output port.

30. A wavelength selective optical switch according to claim 29 and wherein said polarized beam splitting device is any one of a polarization cubic beam splitter, a Glan-Taylor polarizer, a Glan-laser polarizer, a Glan-Thompson prism, a Wollaston prism, and a Rochon polarizer.

31. A wavelength selective optical switch according to claim 29 and also comprising a linear polarizing element having an extinction ratio, disposed between said polarization rotation element and said reflective surface, said linear polarizer being aligned such that it attenuates by said extinction ratio, light having a predetermined polarization direction transmitted by said pixel, and wherein after reflection by said reflective surface, said attenuated light returns through said linear polarizer a second time, such that its intensity is attenuated twice by said extinction ratio.

32. A wavelength selective optical switch according to claim 29 and also comprising at least one linear polarizing element disposed in the path of said light beams before impingement on said polarization rotation element.

33. A wavelength selective optical switch according to claim 29 and wherein said wavelength components of said two light beams reflected back through said polarization rotation element are output from said switch through said second birefringent element in accordance with said control signal applied to said at least one pixel associated with said wavelength components.

34. A wavelength selective optical switch according to claim 29 and also comprising a circulator disposed at said first input port, and wherein those wavelength components of said two light beams reflected back through said polarization rotation element having their polarization direction unrotated by said at least one pixel are directed back to said circulator, such that light incident at said first input port is directed back to said circulator or to said first output port, according to said control signal applied to said pixel.

35. A wavelength selective optical switch according to claim 34 and also comprising a second circulator disposed at said first output port, such that said first output port can add or drop an optical signal.

36. A wavelength selective optical switch according to claim 29 and wherein said dispersive element is a high efficiency grating.

37. A wavelength selective optical switch according to claim 1 and wherein said at least one optical element for focusing said dispersed wavelength components of said expanded light beams onto a focal plane is said dispersive element itself.

38. A wavelength selective optical switch according to claim 10 and wherein said control signal applied to said pixel is such as to rotate the direction of the polarization of light passing through said pixel through essentially 45°.

39. A wavelength selective optical switch according to claim 10 and wherein said beam expanding device is any one of a pair of anamorphic prisms, a single prism, and a cylindrical lens telescope system.

40. A wavelength selective optical switch according to claim 10 and wherein said polarization rotation element is a liquid crystal cell.

41. A wavelength selective optical switch according to claim 10 and also comprising a birefringent wedge in front of said reflective surface, said birefringent wedge being aligned at an angle such that only wavelength components of a predetermined polarization are directed at said reflective surface at normal incidence, and are reflected back along their incident path.

42. A wavelength selective optical switch according to claim 10 and wherein said reflective surface comprises a birefringent wedge having a reflective coating on one surface, said wedge being aligned such that only wavelength components of a predetermined polarization impinge said reflective coating at normal incidence and are reflected back along their incident path.

43. A method of constructing a reflective wavelength selective optical switch, comprising the steps of:
   providing a wavelength selective optical switch utilizing a pixelated polarization rotation element to select a wavelength component of an optical signal to be switched by rotation of the direction of polarization of said wavelength component impinging on a pixel of said polarization rotation element;
   disposing a birefringent wedge after said polarization rotation element, such that said wavelength component of said optical signal passing through said birefringent wedge is deviated at an angle dependent on the polarization direction of said wavelength component; and
   providing a reflective surface after said birefringent wedge, aligned such that only if said wavelength component has a predetermined polarization, does it impinge on said reflective surface at normal incidence, and is reflected back along its incident path.

44. The method of claim 43 and wherein said reflective surface is provided on a reflective element distinct from said birefringent wedge.

45. The method of claim 43 and wherein said reflective surface is provided by means of a coating on a surface of said birefringent wedge.

46. A method of constructing a reflective wavelength selective optical switch, comprising the steps of:
   providing a wavelength selective optical switch utilizing a pixelated polarization rotation element to select a wavelength component of an optical signal to be switched by rotation of the direction of polarization of said wavelength component impinging on a pixel of said polarization rotation element;
   disposing a linear polarizer element after said polarization rotation element, such that transmission of said wavelength component of said optical signal passing though said linear polarizer element is dependent on the polarization direction of said wavelength component; and
   disposing a reflective surface after said linear polarizer element, such that only if said wavelength component has a predetermined polarization is it reflected back along its incident path.

47. A method according to claim 46, and wherein said linear polarizer element disposed after said polarization rotation element is operative to increase the blocking ratio of said switch.

48. A wavelength selective optical switch, comprising:
   a first birefringent device for receiving input light having a plurality of wavelength components, said device adapted to decompose said input light into two light beams having predefined polarizations;
   a first dispersive element receiving said two light beams having predefined polarizations, and dispersing different wavelength components of said light beams;
   a first at least one optical element for focusing said dispersed wavelength components of said two light beams of predefined polarizations onto a focal plane;
   a polarization rotation element located essentially at said focal plane, said polarization rotation element being pixelated generally along the direction of said dispersion such that separate pixels are associated with separate wavelength components of said light beams, at least one pixel of said polarization rotation element being operative to rotate the polarization of light passing through said pixel according to a control signal applied to said pixel;
   a reflective surface disposed in proximity to and after said polarization rotation element, said reflective surface being aligned such that said light beams are reflected back through said pixel and along output paths spatially distinct from the paths of incidence of said light beams; and
   an output section for outputting said light, said output path comprising at least one polarization selective device receiving said light beams after passing through said pixel, and transmitting only light having a predetermined polarization, such that transmission of said light beams is determined by said control signal.

49. A wavelength selective optical switch according to claim 48, and wherein said output section for outputting said light comprises:
   at least one optical element for collimating said output light beams; and
   a dispersive element operative for combining said separate wavelength components of said light beams into multi-wavelength output light;
   and wherein said polarization selective device is a second birefringent device for combining said two light beams into one beam for output.

50. A wavelength selective optical switch according to claim 49 and wherein said at least one optical element in said output section is common with said first at least one optical element.

51. A wavelength selective optical switch according to claim 49 and wherein said dispersive element in said output section is common with said first dispersive element.

52. A wavelength selective optical switch according to claim 48 and also comprising a beam expanding device disposed before said first dispersive element, for expanding said two light beams having predefined polarizations in a predetermined plane, and wherein said first dispersive element is aligned such that different wavelength components of said expanded light beams are dispersed in said predetermined plane.

53. A wavelength selective optical switch according to claim 52 and wherein said output section for outputting said light also comprises a beam expanding device aligned such that said multi-wavelength output light beams are compressed in said predetermined plane.

54. A wavelength selective optical switch according to claim 53 and wherein said beam expanding device in said output section is common with said first beam expanding device.

55. A wavelength selective optical switch according to claim 48 and wherein said first birefringent device is such as to decompose said input light into two light beams having the same polarization direction.

56. A wavelength selective optical switch according to claim 55 and also comprising at least one linear polarizing element.

57. A wavelength selective optical switch according to claim 49, wherein said first birefringent device and said second birefringent device have optical axes, and wherein said birefringent devices are arranged with their optical axes mutually convergent, such that beams birefracted in said birefringent devices converge.

58. A wavelength selective optical switch according to claim 49, wherein said first birefringent device and said second birefringent device have optical axes, and wherein said birefringent devices are arranged with their optical axes mutually divergent, such that beams birefracted in said birefringent devices diverge.

59. A wavelength selective optical switch according to claim 55 and also comprising a polarized beam splitter disposed between said beam expanding device and said polarization selective device, such that said polarized beam splitter directs light incident thereon from said pixel of said polarization rotation element either to said polarization selective device, or to a separate port, according to said control signal applied to said pixel.

60. A wavelength selective optical switch according to claim 48, and wherein said first birefringent device is such as to decompose said input light into two light beams having different polarization directions.

61. A wavelength selective optical switch according to claim 48 and wherein said input and output paths are aligned such that their common plane is perpendicular to said dispersion plane.

62. A wavelength selective optical switch according to claim 48 and wherein said reflective surface is aligned such that said output paths and said paths of incidence of said light beams are disposed in said dispersion plane.

63. A wavelength selective optical switch according to claim 49, and wherein at least one of said input light and said output light are respectively input to or output from said switch by means of a fiber optical collimator.

64. A wavelength selective optical switch according to claim 49, and wherein said input light is input to said switch and said output light is output from said switch by means of a dual collimator.

65. A wavelength selective optical switch according to claim 64 and also comprising a roof prism downstream of said dual collimator.

* * * * *